(12) United States Patent
Fishman et al.

(10) Patent No.: US 10,483,759 B2
(45) Date of Patent: Nov. 19, 2019

(54) INTEGRATED MULTI-MODE LARGE-SCALE ELECTRIC POWER SUPPORT SYSTEM FOR AN ELECTRICAL GRID

(71) Applicant: ALENCON ACQUISITION CO., LLC, Hatboro, PA (US)

(72) Inventors: Oleg S. Fishman, Maple Glen, PA (US); Ulrich K. W. Schwabe, Blue Bell, PA (US); Zekeriya Dereli, Hatboro, PA (US); Hanan Fishman, Fort Washington, PA (US)

(73) Assignee: ALENCON ACQUISITION CO., LLC, Hatboro, PA (US)

( * ) Notice: Subject to any disclaimer, the term of this patent is extended or adjusted under 35 U.S.C. 154(b) by 314 days.

(21) Appl. No.: 15/478,291

(22) Filed: Apr. 4, 2017

(65) Prior Publication Data

US 2017/0338651 A1 Nov. 23, 2017

Related U.S. Application Data

(60) Provisional application No. 62/319,389, filed on Apr. 7, 2016.

(51) Int. Cl.
*H02J 1/10* (2006.01)
*H02J 3/38* (2006.01)
(Continued)

(52) U.S. Cl.
CPC ................................... *H02J 3/01* (2013.01); *H02J 3/18* (2013.01); *H02J 3/32* (2013.01); *H02J 3/383* (2013.01);
(Continued)

(58) Field of Classification Search
CPC ........ H02J 3/01; H02J 3/18; H02J 3/32; H02J 3/383; H02J 3/386; H02J 7/35;
(Continued)

(56) References Cited

U.S. PATENT DOCUMENTS 3,611,085 A 10/1971 Rosenberry, Jr.
3,628,123 A 12/1971 Rosa
(Continued)

FOREIGN PATENT DOCUMENTS

EP 1837985 A2 9/2007
EP 2104216 A1 9/2009
(Continued)

OTHER PUBLICATIONS

Komkrit Chomsuwan, Photovoltaic Grid-Conneted Inverter Using Two-Switch Buck-Boost Converter, 2002, pp. 1527-1530, IEEE.

*Primary Examiner* — Rexford N Barnie
*Assistant Examiner* — Toan T Vu

(57) ABSTRACT

An integrated multi-mode, large-scale electric power support system supplies on demand at least 2,500 kW to an electrical grid with low harmonic distortion either from co-located solar or wind renewable energy DC power sources or in combination with, or alternatively, from system stored energy DC power sources via a plurality of DC-to-AC inverters with phase-shifted outputs. The power support system can also inject on demand grid power factor correcting reactive power. An alternative high voltage power support system can supply on demand at least 50 megawatts to the grid.

12 Claims, 25 Drawing Sheets

(51) Int. Cl.
*H02J 3/01* (2006.01)
*H02M 7/5387* (2007.01)
*H02J 7/35* (2006.01)
*H02J 3/32* (2006.01)
*H02M 1/12* (2006.01)
*H02J 3/18* (2006.01)
*H02M 1/00* (2006.01)

(52) U.S. Cl.
CPC ............... *H02J 3/386* (2013.01); *H02J 7/35* (2013.01); *H02M 1/12* (2013.01); *H02M 7/5387* (2013.01); *H02M 7/53875* (2013.01); *H02M 2001/007* (2013.01)

(58) Field of Classification Search
CPC .. H02M 1/12; H02M 7/5387; H02M 7/53875; H02M 2001/007
USPC ........................................................ 307/52
See application file for complete search history.

(56) References Cited

U.S. PATENT DOCUMENTS

| | | | |
|---|---|---|---|
| 3,792,286 A | 2/1974 | Meier | |
| 3,876,923 A | 4/1975 | Humphrey et al. | |
| 3,979,662 A | 9/1976 | Klein | |
| 4,053,820 A | 10/1977 | Peterson et al. | |
| 4,204,264 A | 5/1980 | Lipman | |
| 4,224,660 A | 9/1980 | Mohan | |
| 4,225,914 A | 9/1980 | Hirata et al. | |
| 4,366,532 A | 12/1982 | Rosa et al. | |
| 4,445,049 A | 4/1984 | Steigerwald | |
| 4,581,573 A | 4/1986 | Dobsa et al. | |
| 4,680,690 A | 7/1987 | Dickerson | |
| 4,707,777 A | 11/1987 | Cho | |
| 4,750,098 A | 6/1988 | Heinrich et al. | |
| 4,779,181 A | 10/1988 | Traver et al. | |
| 4,870,557 A | 9/1989 | Stacey | |
| 4,953,071 A | 8/1990 | Lipman | |
| 4,975,822 A | 12/1990 | Lipman | |
| 5,065,303 A | 11/1991 | Nguyen et al. | |
| 5,168,437 A | 12/1992 | Gyugyi et al. | |
| 5,682,303 A | 10/1997 | Goad | |
| 5,892,664 A | 4/1999 | Veder | |
| 6,166,527 A | 12/2000 | Dwelley et al. | |
| 6,169,676 B1 | 1/2001 | Dahler et al. | |
| 6,259,017 B1 | 7/2001 | Takehara et al. | |
| 6,340,851 B1 | 1/2002 | Rinadli et al. | |
| 6,563,718 B1 | 5/2003 | Li et al. | |
| 7,576,449 B2 | 8/2009 | Becker et al. | |
| 7,672,149 B2 | 3/2010 | Falk | |
| 7,808,125 B1 | 10/2010 | Sachdeva et al. | |
| 7,929,325 B2 | 4/2011 | de Rooij et al. | |
| 7,965,088 B2 | 6/2011 | Thorngreen et al. | |
| 8,130,518 B2 | 3/2012 | Fishman | |
| 8,212,408 B2 | 7/2012 | Fishman | |
| 8,213,199 B2 | 7/2012 | Fishman | |
| 9,118,215 B2 | 8/2015 | Fishman et al. | |
| 9,350,166 B2 | 5/2016 | Fishman et al. | |
| 2003/0227172 A1 | 12/2003 | Erdman et al. | |
| 2005/0105224 A1 | 5/2005 | Nishi | |
| 2005/0275386 A1 | 12/2005 | Jepsen et al. | |
| 2007/0133241 A1 | 6/2007 | Mumtaz et al. | |
| 2007/0217239 A1 | 9/2007 | Rottger et al. | |
| 2007/0252716 A1 | 11/2007 | Burger | |
| 2008/0192510 A1 | 8/2008 | Falk | |
| 2008/0280175 A1 | 11/2008 | Gurunathan et al. | |
| 2008/0285317 A1 | 11/2008 | Rotzoll | |
| 2009/0102440 A1 | 4/2009 | Coles | |
| 2009/0140577 A1 | 6/2009 | Fishman | |
| 2009/0283129 A1 | 11/2009 | Foss | |
| 2009/0302686 A1 | 12/2009 | Fishman | |
| 2010/0013317 A1 | 1/2010 | Ballantine et al. | |
| 2010/0133911 A1 | 6/2010 | Williams et al. | |
| 2010/0156188 A1 | 6/2010 | Fishman | |
| 2010/0283325 A1 | 11/2010 | Marcianesi et al. | |
| 2010/0301991 A1 | 12/2010 | Sella et al. | |
| 2010/0302819 A1 | 12/2010 | O'Brien et al. | |
| 2011/0310642 A1 | 12/2011 | Dai et al. | |
| 2012/0080955 A1 | 4/2012 | Fishman et al. | |
| 2012/0205981 A1* | 8/2012 | Varma | H02J 3/01 307/64 |
| 2014/0132075 A1 | 5/2014 | Fishman et al. | |
| 2016/0372926 A1* | 12/2016 | Pahlevaninezhad | H02J 3/382 |

FOREIGN PATENT DOCUMENTS

| | | |
|---|---|---|
| EP | 2276137 A2 | 1/2011 |
| JP | H04-121070 A | 4/1992 |
| JP | 2000-112545 A | 4/2000 |
| JP | 2000-287387 A | 10/2000 |
| JP | 2001-359239 A | 12/2001 |
| JP | 2002-517976 A | 6/2002 |
| JP | 2003-339118 A | 11/2003 |
| JP | 2004-104963 A | 4/2004 |
| JP | 2006-522492 A | 9/2006 |
| JP | 2007-259694 A | 10/2007 |
| JP | 2008-500797 A | 1/2008 |
| JP | 2008-161037 A | 7/2008 |
| JP | 2009-239990 A | 10/2009 |
| JP | 3154942 U | 10/2009 |
| JP | 2010-512139 A | 4/2010 |
| KR | 10-2008-0001828 A | 1/2008 |
| WO | 99/63650 A1 | 12/1999 |
| WO | 2004/090559 A1 | 10/2004 |
| WO | 2006/133714 A1 | 12/2006 |
| WO | 2007/048420 A1 | 5/2007 |
| WO | 2011/005866 A2 | 1/2011 |
| WO | 2011/033308 A2 | 3/2011 |

* cited by examiner

INTEGRATED MULTI-MODE LARGE-SCALE ELECTRIC POWER SUPPORT SYSTEM FOR AN ELECTRICAL GRID

CROSS-REFERENCE TO RELATED APPLICATIONS

This application claims priority to U.S. Provisional Application No. 62/319,389 filed Apr. 7, 2016.

FIELD OF THE INVENTION

The present invention relates to an integrated multi-mode, large-scale electric power support systems capable of supplying at least 2,500 kW from centrally located solar renewable energy DC power sources or wind renewable energy DC power sources and stored energy DC power sources to an electrical grid, and absorbing or supplying reactive power to the electrical grid from an integrated system available on demand from the electrical grid.

BACKGROUND OF THE INVENTION

The electrical grid supplies electricity to consumers connected to the grid for various types of electrical load, for example: electronics; lighting; heating, ventilation and air condition; and transportation equipment. Each electrical load requiring electrical energy from an electrical grid in the form of alternating current and voltage can have time varying load demands for electrical power either in the long term (for example, month-to-month) or in the short term (for example, minute-to-minute). Also the electrical load may be stable or unstable.

Often electrical loads on the transmission and distribution portions of an electrical grid have a reactive power (Q) demand measured in volt-amperes reactive (var) in addition to an active (or real) power (P) demand measured in watts (W) that can be mathematically represented as a total complex power, S, measured in volt-amperes (VA) by the equation:

$$S = P + jQ \qquad \text{(Equation 1)}$$

where j is the mathematical imaginary unit.

The electrical grid must supply the magnitude of complex power, S, as demanded by the connected electrical loads.

The current for the required active power demand is vectorially in phase with the applied voltage and active power (W) produces electrical (mechanical) work (for example; a motor rotating a conveyor belt; compressors heating or cooling an enclosed volume; or lighting fixtures supplying light to an area). Active power demand magnitude can be mathematically expressed by the equation:

$$P = S \times \cos \varnothing \qquad \text{(Equation 2)}$$

where cos ø is the power factor, which is equal to the ratio of active power (P) to complex power (S).

The current for the required reactive power demand does not produce work but is required for the electrical characteristics of certain loads and burdens the electrical grid with reactive current requirements that vectorially lag the applied voltage by 90 degrees. Reactive power demand magnitude can be mathematically expressed as:

$$Q = S \times \sin \varnothing \qquad \text{(Equation 3)}$$

Electrical grid operators monitor transmission and distribution circuits connected to the grid for variations in the power factor, load magnitude, voltage, and frequency. Excessive reactive power in the connected circuits affects not only the efficiency but also the stability of the overall grid (power system).

Excessive reactive load currents are carried by power lines between the grid's generating sources and loads connected to the grid without producing work and can cause sagging line voltages and load voltages. Reactive load power can optionally be generated or absorbed in close proximity to a load to eliminate reactive currents from the power lines.

Similarly, varying load demand, as well as reactive load currents, cause voltages on the grid power lines and load to fluctuate. Power distribution regulators obligate the operator of the grid to maintain strict limits on the supplied voltage, typically no greater than five percent or less than ten percent of a nominal grid voltage. The grid frequency is controlled more strictly to no more than 0.02 percent or less than 0.02 percent of a nominal value by some grid regulators. To mitigate the effects of varying load demand and reactive loads electrical utilities employ different devices and procedures.

Grid power generation and power consumption should always be balanced. Surplus grid power generation greater than grid power demand causes increase in voltages and frequency on the grid. Conversely, deficit grid power generation less than grid power demand causes decreases in voltages and frequency on the grid.

While reduction of grid voltage in some degree has a self-stabilizing effect on linear loads (that is, power consumption drops as voltage drops), grid frequency reduction in sections of the grid network can damage the grid by allowing grid power generators to loose synchronization and become unstable. For this reason the regulations on frequency variations are stricter as mentioned above, and time for recovery from a grid low frequency condition is shorter.

Reactive loads can be compensated for by passive reactive components. To some degree increasing load demand may be compensated for by increased energy supply. Other means of stabilizing the voltage may be utilized, such as: increased tariffs during times of high demand; penalties to grid customers with large inductive loads (that is, low power factor loads); curtailment of power generation during periods of low demand, or in extreme cases, disconnecting grid customers during periods of high demand on the grid.

When load is changing rapidly it is often very difficult to react quickly and maintain stable voltages on the distribution network of the grid, particularly when passive components, such as capacitor banks, are used since they have limited response times as well as a limited number of engagement cycles that prevent the passive components from being actively used on a large scale to an electrical grid.

Renewable electrical energy sources, such as photovoltaic or wind energy sources, could play a positive role in grid stabilization. Solar energy typically coincides with periods of high power demand on the grid. However renewable electrical energy sources can introduce a degree of instability due to the intermittency of the supply of electrical power from solar energy depending upon geographical location of the sources. Combinations of renewable energy sources (for example, wind and solar) and energy storage can alleviate the intermittency issue.

Power electronics used in renewable energy and storage systems generally employ direct current to alternating current (DC/AC) inverters that can provide short time response capabilities far greater than conventional rotating generators when it comes to power generation. This remains true when compared to most conventional means of compensating for reactive power. In many cases these power electronics can provide such capabilities without any changes in hardware, and therefore can help provide power support to a grid in an economical fashion.

Most DC/AC inverters used in renewable energy power generation and power factor correction applications utilize pulse switch modulation technology (PWM). However PWM switching typically results in high inverter losses which prevent the generation of substantial reactive power. Also the smoothing inductors both in the input of the active filter and the output of the inverters also contribute to the inductive characteristics of the load.

U.S. Pat. Nos. 8,130,518 B2 and 8,213,199 B2, which are incorporated herein by reference in their entireties, disclose the concept of multiphase grid synchronized regulated current source inverter systems (MGS-RCSIS) where the combination of a plurality of current fed three phase inverters convert DC voltage from solar and wind renewable energy sources into AC voltage compatible with the electrical grid. Conversion is accomplished by current regulation of the output from the DC renewable energy sources to the input of each one of multiple inverters in a MGS-RCSIS system, with each inverter outputting multiple phase currents that are out of phase with the multiple phase currents outputted from all other inverters in the system. Each of the multiple phases has a step-shape current from all of the inverters in a system that are connected to the secondary windings of a phase transformation network that produces a three phase sine wave current output waveform for injection into the electric power grid. The method of reduction of harmonic distortion by combining a plurality of phase-shifted distorted currents from a number of inverters is known as the harmonic neutralization (HN) method.

It is one objective of the present invention to provide a co-located multi-mode, large scale electric power supply support system for an electrical grid where the support system's power source is solar or wind renewable energy with a minimum capacity of 2,500 kW integrated with a stored energy power source where the renewable energy power can be supplied totally or partially to the grid with low harmonic distortion in combination with supply of stored energy power to the grid or charging the stored energy power source from the renewable energy power source or the grid.

It is another objective of the present invention to provide a co-located multi-mode, large scale electric power supply support system for an electrical grid where the support system's power source is solar or wind renewable energy with a minimum capacity of 2,500 kW integrated with a stored energy power source where the electric power support system can absorb reactive power from the grid or deliver reactive power to the grid to improve grid stability.

SUMMARY OF THE INVENTION

In one aspect the present invention is an integrated multi-mode, large-scale electric power support system for supplying on demand at least 2,500 kW to an electrical grid with low harmonic distortion either from co-located solar or wind renewable energy DC power sources, or in combination with, or alternatively, from system stored energy DC power sources via a plurality of DC-to-AC inverters with step waveform phase-shifted outputs. The power support system can also inject on demand grid power factor correcting reactive power.

In another aspect the present invention is a method for on demand supply of at least 2,500 kW to an electrical grid with low harmonic distortion from an integrated multi-mode, large-scale electric power support system with co-located solar or wind renewable energy DC power sources, a stored energy DC power source and a plurality of DC-to-AC inverters with step waveform phase-shifted outputs where the inverters can also function as electrical chargers for charging the stored energy DC power source. The method also provides on demand injection of grid power factor correcting reactive power.

In another aspect the present invention is a high voltage integrated multi-mode, large-scale electric power support system for supplying on demand at least 50 megawatts to an electrical grid with low harmonic distortion either from co-located solar or wind renewable energy DC power sources, or in combination, from system stored energy DC power sources via a plurality of DC-to-AC inverters with step waveform phase-shifted outputs via a high voltage DC power transmission link.

In another aspect the present invention is a method for on demand supply of at least 50 megawatts to an electrical grid with low harmonic distortion from a high voltage integrated multi-mode, large-scale electric power support system with low harmonic distortion either from co-located solar or wind renewable energy DC power sources, or in combination with, or alternatively or in combination, from system stored energy DC power sources via a plurality of DC-to-AC inverters with step waveform phase-shifted outputs via a high voltage DC power transmission link.

The above and other aspects of the invention are further set forth in this specification and the appended claims.

BRIEF DESCRIPTION OF THE DRAWINGS

FIG. 1(b) and FIG. 1(c) illustrate one example of an integrated multi-mode, large-scale electric power support system of the present invention for providing on demand power to an electrical grid in which wind renewable energy is used.

DETAILED DESCRIPTION OF THE INVENTION

Figure 1A:
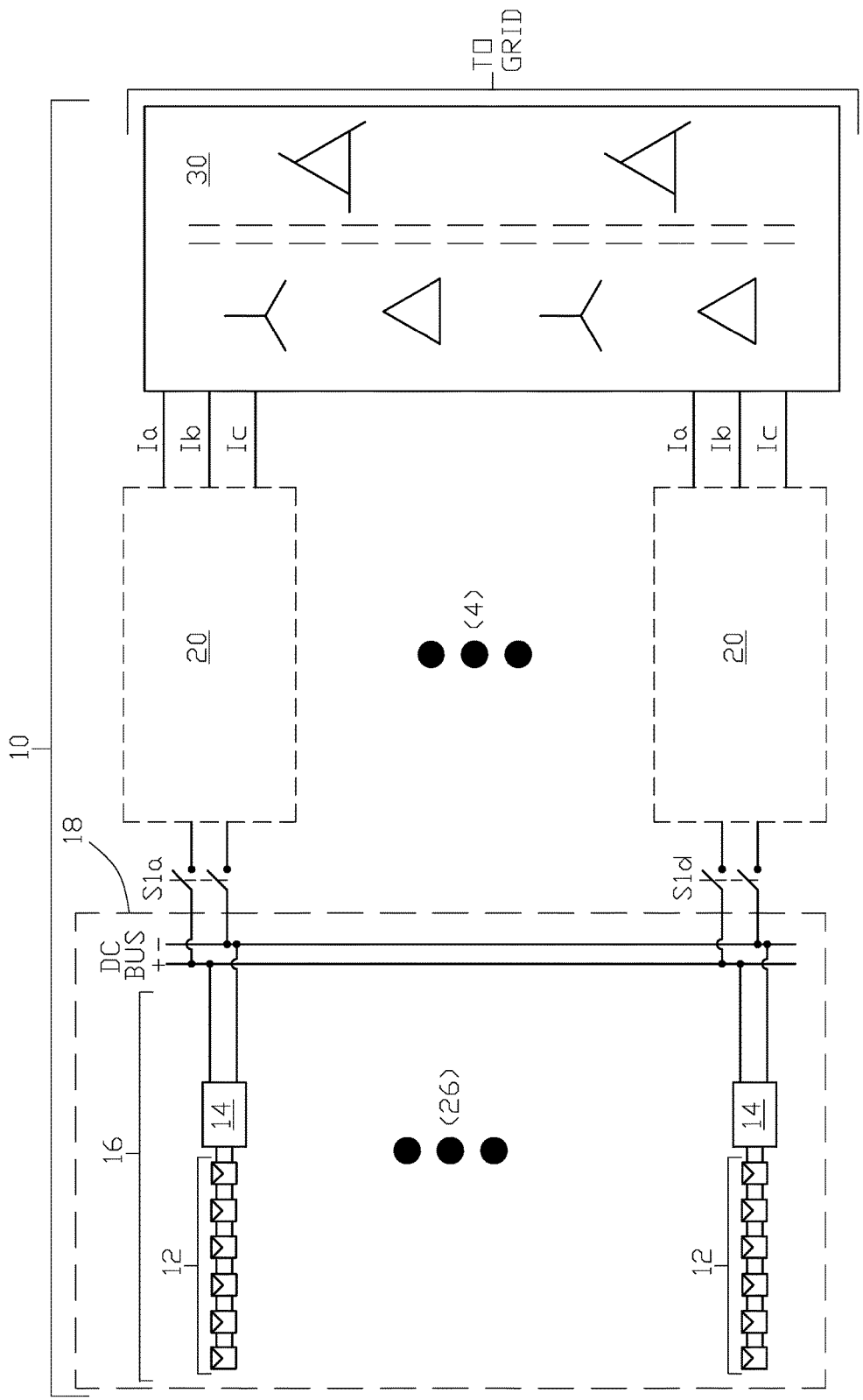
FIG. 1(a) and FIG. 1(c) illustrate one example of an integrated multi-mode, large-scale electric power support system of the present invention for providing on demand power to an electrical grid in which solar renewable energy is used.
Figure 1B:
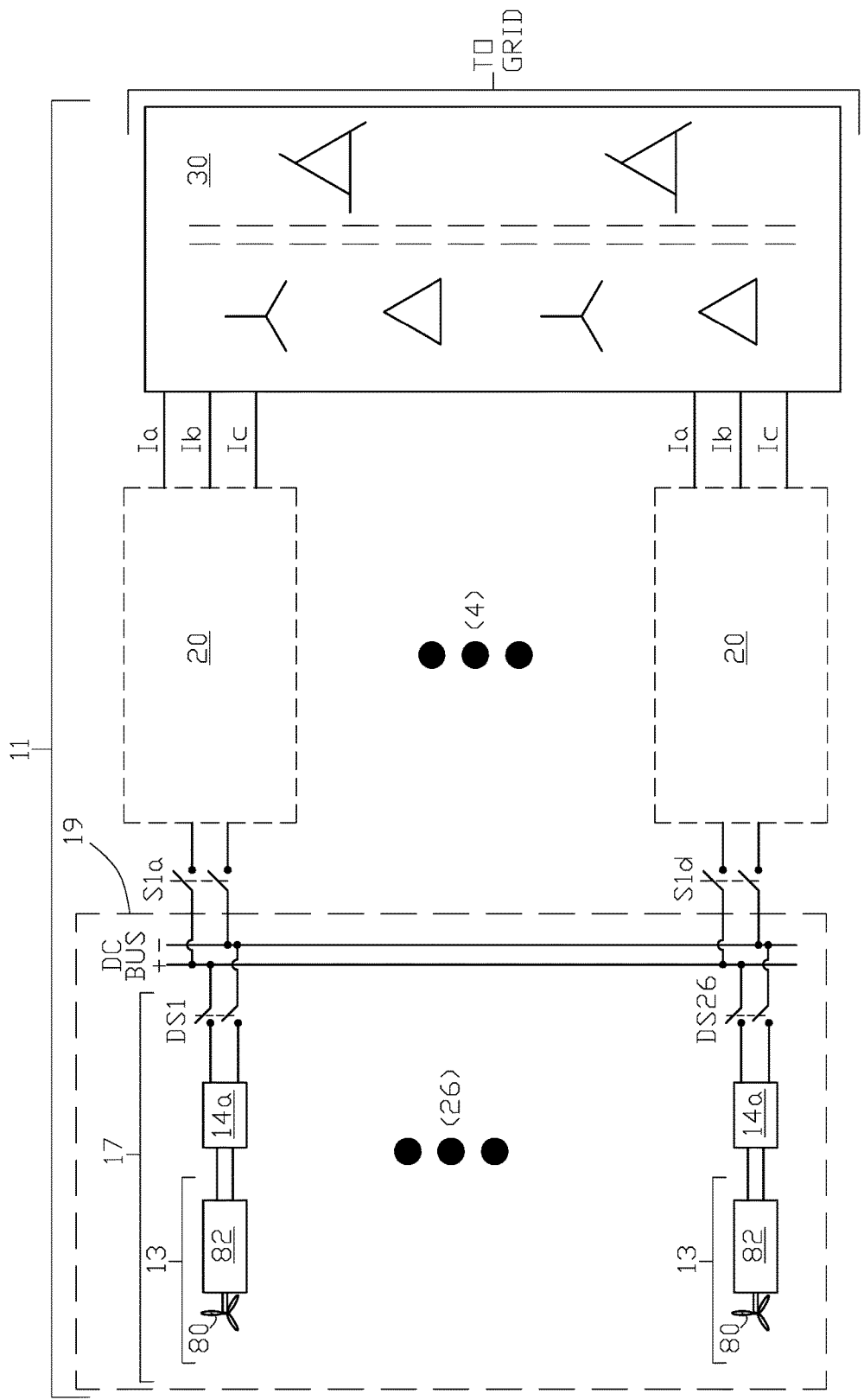
Figure 1C:
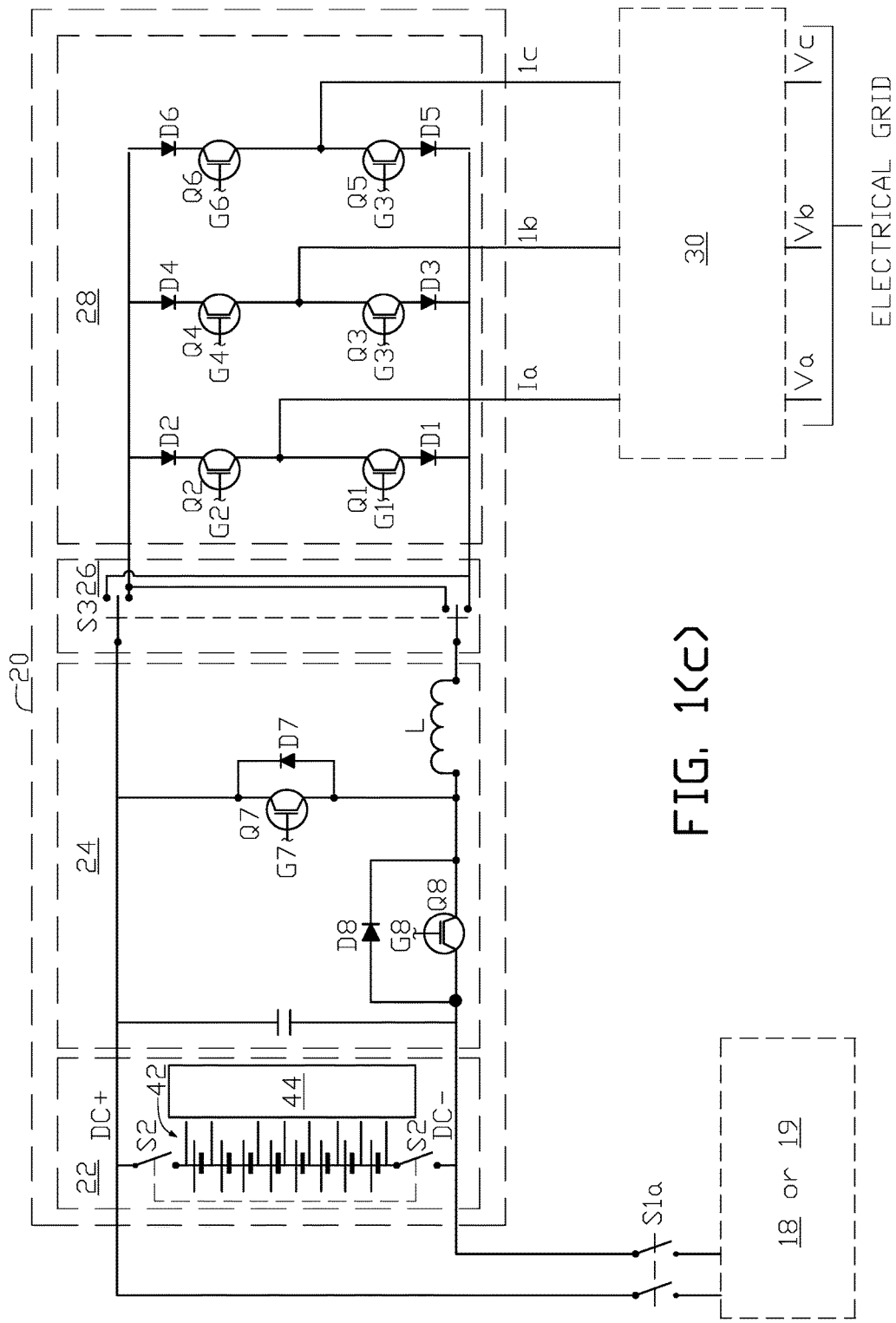

There is diagrammatically illustrated in FIG. 1(a) and FIG. 1(c) one example of a multi-mode, large-scale electrical power support system 10 of the present invention for an electrical grid. System 10 comprises a plurality of renewable energy power optimized string circuits 16. In this example each renewable energy power optimized string circuit 16 comprises a plurality of photovoltaic modules 12 connected to a renewal energy optimizer 14 with galvanic isolation of the photovoltaic modules from the renewable energy DC BUS by galvanic isolation provided between the input and output circuits of the renewal energy optimizer.

Suitable renewal energy optimizers 14 can be selected from the renewable energy power optimizers and transmitters described in U.S. Pat. Nos. 9,118,215 B2 or 9,350,166 B2, or United States Patent Application Publication No. 2014/0132075 A1, each of which three references are incorporated herein by reference in their entireties. A renewable energy power optimizer and transmitter from these three references may be used herein with or without the transmitters disclosed in these three references. A preferred, but limiting, arrangement for a renewable energy power optimizer in the present invention is a renewable energy power optimizer formed from a combination of four DC-to-DC converters as disclosed in any one of these three references.

In the embodiment of the invention shown in FIG. 1(a) the plurality of renewable energy power optimized string circuits 16 and the renewal energy DC BUS comprises photovoltaic power station 18. The term "photovoltaic power station" as used herein refers to a group of co-located photovoltaic modules for the production of a minimum capacity of 2,500 kW of electrical power for supply of the electric power to a grid from an integrated, multi-mode large-scale electric power support system for an electrical grid. A photovoltaic power station is also known in the art as a solar park, solar farm or solar ranch.

In the embodiment of the invention shown in FIG. 1(a) the photovoltaic power station comprises a total of twenty-six renewable energy power optimized string circuits 16 with only the first and last string circuits shown in the figure and the three vertical dots between the first and the last string circuits representing the identical remaining optimized string circuits that, in total, has the electrical capacity to supply at least 2,500 kW of solar power to the system's multiple power modules 20.

Although there are a total of twenty-six renewable energy power optimized string circuits in the embodiment in FIG. 1(a) with six photovoltaic modules shown in each string circuit, the total number of renewable energy power optimized string circuits and the number of photovoltaic modules in each string circuit required for the minimum electrical capacity of 2,500 kW is selected based upon a particular application of the present invention and will vary.

As shown in FIG. 1(c) each of the four system's power module 20 shown in the embodiment in FIG. 1(a) comprises stored energy module 22, current controller module 24, mode transfer switch 26 and inverter/charge module 28. The multiple power modules 20 process the system's renewable energy power and stored energy power in various modes of configuration and operation with additional modes of configuration and operation for connecting power factor correcting reactive power to the electrical grid.

Stored energy module 22 comprises a bank of energy storage devices, which in this embodiment are referred to as battery 42 of a suitable type that is selectively connectable across the DC+ and DC− buses of the power module DC BUS via switching device S2. Battery types included, but are not limited to, lead-acid, lithium-ion or redox flow batteries arranged as a single battery or a bank of batteries with a capacity of at least 2,500 kW. Battery management system 44 controls battery 42 including battery charge equalization and battery drain equalization of all battery cells in battery 42 as appropriate for the selected battery type. In its broadest aspect the energy storage devices can be any type of energy storage device charged with DC electrical current and that can supply on demand DC electrical current. In other embodiments of the invention multiple stored energy modules 22 may be provided for convenient selection and operation of the multiple stored energy modules.

Current controller subsystem 24 in this embodiment of the invention comprises transistors Q7 and Q8, and power diodes D7 and D8, that in conjunction with inductor L that can be configured into a voltage boost circuit or a voltage buck circuit. Power transistors Q7 and Q8 are selected from the following transistor types: insulated-gate bipolar transistor (IGBT); field-effect transistor (FET): or silicon carbon metal-oxide-semiconductor field-effect transistor (SiC MOSFET), or any other type for a particular application of the present invention. Power diodes D7 and D8 can be selected from silicon or silicon-carbide type diodes, or any other type for a particular application of the present invention.

Mode transfer switch 26 in this embodiment of the invention comprises switching device S3 which functions as a means to reverse the polarity of the input to the inverter/charge module 28 to convert between a DC-to-AC three phase high power inverter and a charge circuit for charging system's battery 42. Mode transfer switch 26 may be a suitable electromechanical switch or a solid state electronic switch that can provide switching between DC-to-AC three phase high power inverter and the system's stored energy charge circuit.

Figure 2:
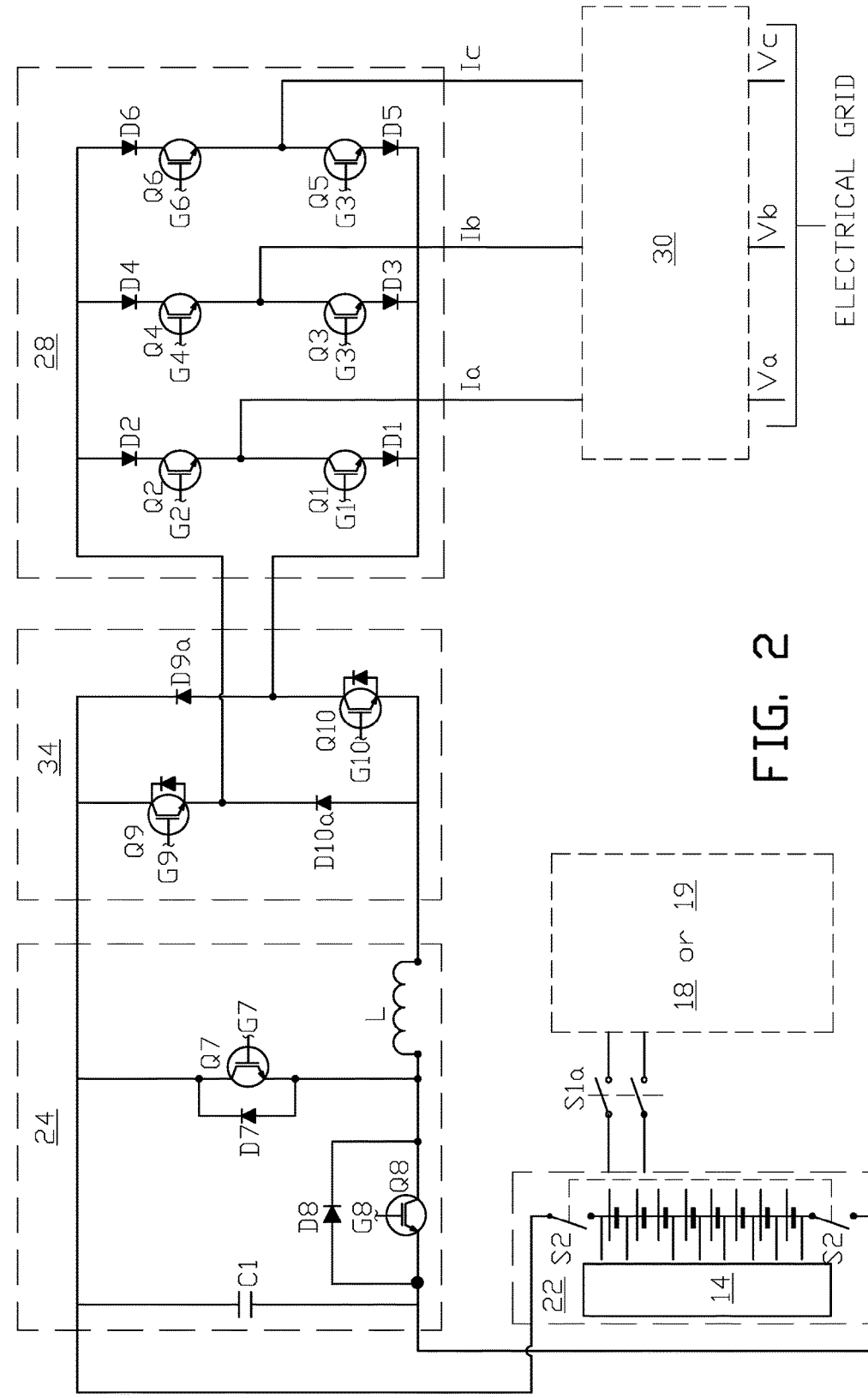
FIG. 2 illustrates one example of a solid state mode transfer switch that can be utilized in an integrated multi-mode, large-scale electric power support system of the present invention for providing on demand power to an electrical grid of the present invention.

In one embodiment of the invention the electronic switch 34 shown in FIG. 2 can be utilized for the mode transfer switch with switch transistor Q9 and diode D10a connected in series across the power module DC bus in combination with switch transistor Q10 and diode D9a also connected across the power module DC bus so that when switch transistors Q9 and Q10 are closed, DC current flows from the current controller module 24 into inverter/charge module 28 with DC+ and DC− bus voltage polarities as shown in the figure for inverter operation, and when switch transistors Q9 and Q10 are open, DC current flows from the inverter/charge module 28 with reversed bus polarities from that shown in the figure for charging of battery 42 in the stored energy module when switching device S2 is closed.

The inverter/charge module 28 can be configured to either convert DC current from the power module DC BUS into AC three phase high power current Ia, Ib and Ic to supply the electrical grid or to rectify the AC three phase current to charge battery 42. The inverter/charge module comprises six power transistors Q1 through Q6 and six power diodes D1 through D6. The power transistor types and diode types can be selected as disclosed above for power transistors and diodes in the current controller module.

In the embodiment of the invention shown in FIG. 1(a) and FIG. 1(c) there is a total of four power modules 20 for, in total, processing a minimum of 2,500 kW of the system's renewable energy power and/or the system's battery power with only the first and the fourth power modules represented by dashed boxes in FIG. 1(a) and the three vertical dots between the first and the fourth power modules representing the remaining two power modules. The power module DC BUS (DC+ and DC−) in each of the four power modules 20 is connectable to the renewable energy DC BUS via separate switching devices S1a to S1d (with switches S1b and S1c for the second and third power modules not shown in the drawing). In the embodiment of the invention shown in FIG. 1(a) and FIG. 1(c) when all twenty-six renewable energy power optimized string circuits 16 and four power modules 20 are connected to the power module DC BUS, system 10 can process at least 2,500 kW of optimized renewable energy in configuration and operational modes as further described herein when a demand is made by the electrical grid for additional grid power from an integrated multimode, large-scale electric power support system of the present invention.

The AC three phase output currents, Ia, Ib and Ic, from the inverter/charge module 28 are connected to a phase shifting transformation network 30 for higher harmonic neutralization when configured for delivery of AC power to the electrical grid. Phase shifting transformation network 30 can be selected from any of the phase shifting transformer arrangements disclosed in the U.S. Pat. Nos. 8,130,518 B2 or 8,213,199 B2, which are incorporated herein by reference in their entireties. In the embodiments of the present invention shown in FIG. 1(a), FIG. 1(b) and FIG. 1(c) one preferred, but non-limiting, twelve phase shifting transformation network comprises two transformers with delta-wye inverter/charge output connected windings (referred to as secondary windings) and an extended delta grid connected winding (referred to as primary winding) as shown in FIG. 29 of U.S. Pat. Nos. 8,130,518 B2 or 8,213,199 B2.

There is diagrammatically illustrated in FIG. 1(b) and FIG. 1(c) one example of an integrated multi-mode, large-scale electrical power support system 11 of the present invention for an electrical grid. System 11 comprises a plurality of wind renewable energy wind turbine power electronics blocks 17 that each comprise a wind turbine 80 and wind turbine controller 82 having, in addition to other components, an AC-to-DC rectifier for supply of DC power to a wind renewal energy optimizer 14a. The galvanic isolation of the plurality of wind renewable energy wind turbine power electronics blocks from the renewable energy DC BUS is achieved via galvanic isolation provided between the input and output circuits of the renewal energy optimizer.

In the embodiment of the invention shown in FIG. 1(b) the plurality of renewable energy power optimized string circuits 17 and the renewable energy DC BUS comprise wind farm 19. The term "wind farm" as used herein refers to a group of co-located wind turbines for the production of a minimum capacity of 2,500 kW of electrical power for supply of the electric power to a grid from an integrated, multi-mode large-scale electric power support system for an electrical grid.

In other embodiments of the invention the integrated multi-mode, large-scale electrical power support system may comprise a combination of: (1) a plurality of renewable energy power optimized string circuits where each circuit is formed from a plurality of photovoltaic modules connected to a renewal energy power optimized string circuit; and (2) a plurality of renewable energy wind turbine power electronics blocks where each block is formed from a wind turbine 80 and wind turbine controller 82 having, in addition to other components, an AC-to-DC rectifier for supply of DC power to a wind renewal energy optimizer 14a.

Although the configured modes are described for an integrated multi-mode, large-scale electric power support system of the present invention where the renewable energy is solar energy, the configured modes are similar when the renewable energy is wind energy or a combination of solar energy and wind energy.

Mode I: System Renewable Energy Processed and Supplied to Grid.

Figure 3A:
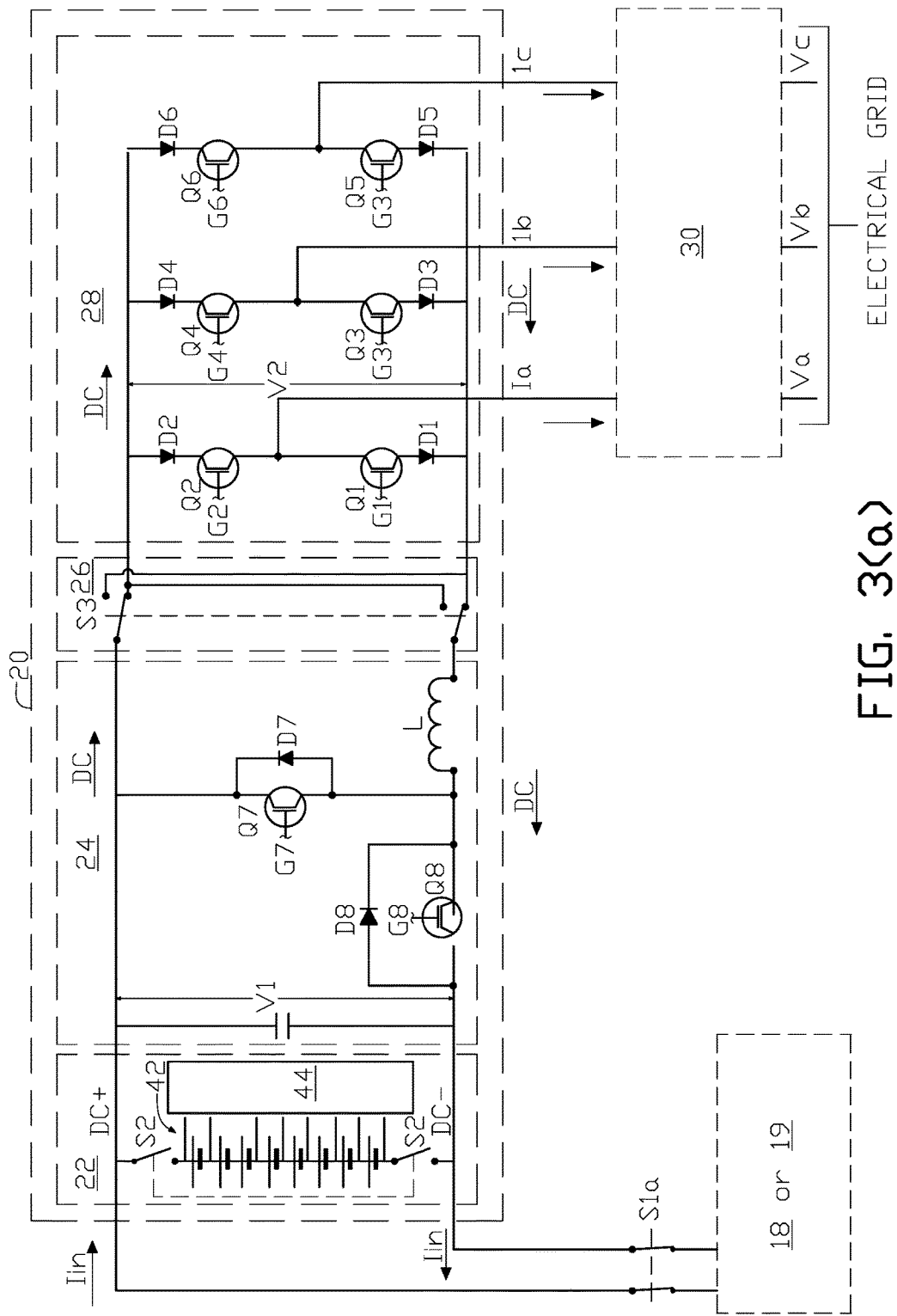
FIG. 3(a) diagrammatically illustrates one example of one of a plurality of system power modules for an integrated multi-mode, large-scale electric power support system of the present invention configured for all of the system's renewable energy DC power to be processed for delivery to the electrical grid at unity power factor.

In mode I an integrated multi-mode, large-scale electric power support system of the present invention is configured and operates in a system renewable energy power processing and grid supply mode when optimized DC power is harvested (collected) from the plurality of photovoltaic modules 12 in each optimizer string circuit and converted into AC active and reactive power through current controller module 24 and inverter/charge module 28 for supply to the electrical grid as shown in FIG. 3(a) for the first of the four identical power modules 20 in the example of the invention shown in FIG. 1(a). In this mode each power control module 20 operates similarly to a multiphase grid synchronized regulated current source inverter as described in U.S. Pat. Nos. 8,130,518 B2 and 8,213,199 B2, both of which references are herein incorporated by reference.

In mode I for the embodiment of the invention shown in FIG. 1(a) and FIG. 1(c) switches S1a through S1d for each of the four power modules 20 utilized in this embodiment, are closed to supply DC current from the plurality of renewal energy power optimized string circuits 16 connected to the renewable energy DC BUS to the power module DC BUS in each of the four power modules. Mode switching device S3 is in the inverter position and energy storage module 22 is electrically isolated from the DC BUS via open battery switching device S2.

In mode I current controller module 24 adjusts the imbalance of DC voltages at the outputs of renewable energy optimizers 14 connected to the renewable energy DC BUS across the input to the power module DC BUS in inverter/charge module 28 (operating in the inverter mode). The current controller module ensures that the total DC current harvested from the outputs of all renewable energy optimizers 14 is equally distributed among the inverter circuits in the inverter/charge module of all four power modules 20.

In mode I transistor Q8 and diode D7 are configured as a voltage buck controller circuit. By applying gate pulses to gate G8 of transistor Q8 the magnitude of the DC current flowing into the inverter circuit is controlled so that longer duty cycles of the gate G8 pulse represent greater magnitude of DC current.

Figure 3B:
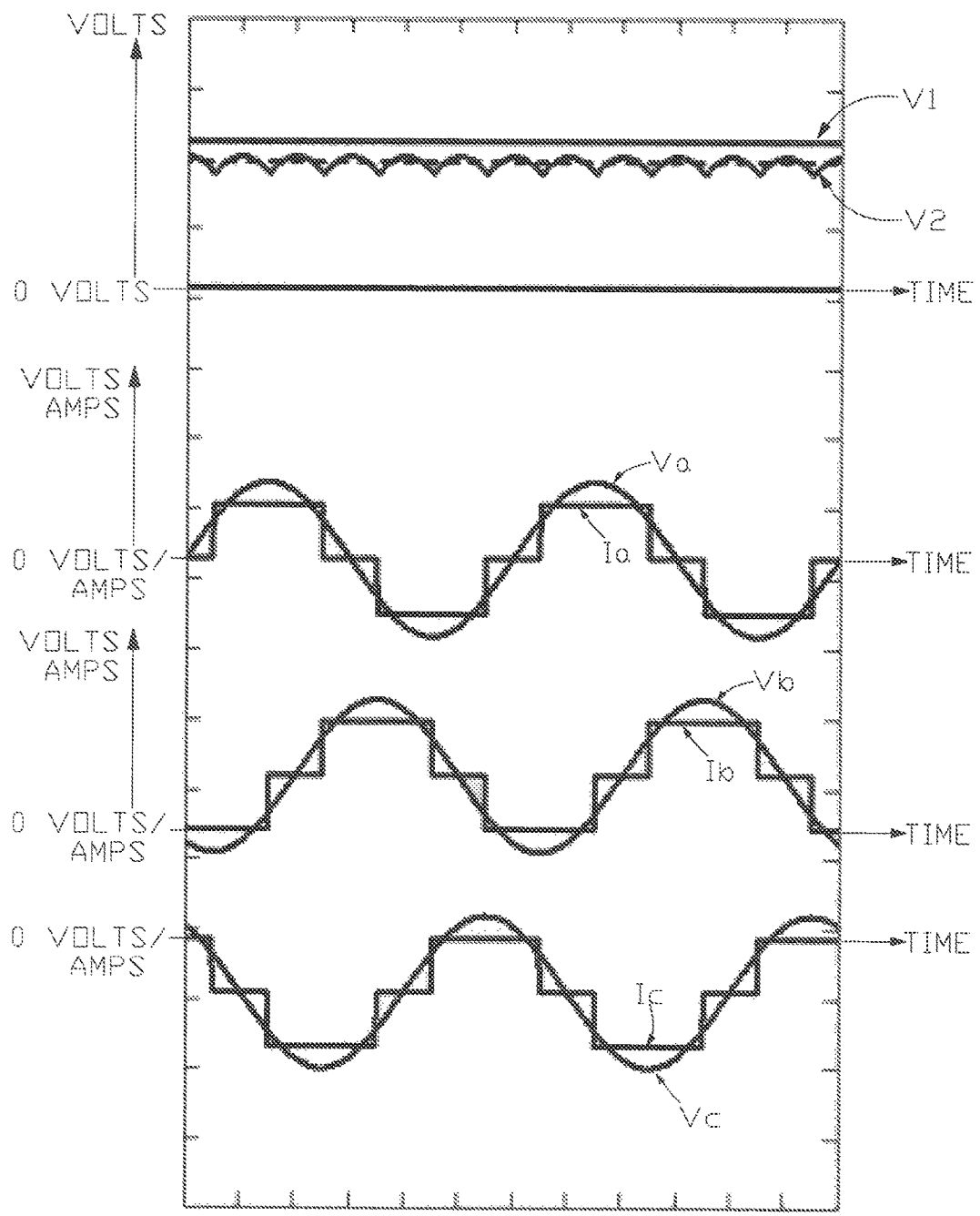
FIG. 3(b) illustrates system waveforms for the configured mode shown in FIG. 3(a).

As shown in FIG. 3(b) inverter transistors Q1 through Q6 are controlled so that AC currents Ia, Ib and Ic supplied to the grid via the phase shifting transformer network are in phase with grid voltages Va, Vb and Vc. The DC voltage (V1) from the photovoltaic modules in the optimized string circuits is higher than the ripple voltage (V2) across the inverter's DC+ and DC− power module bus, which indicates that DC current is supplied from the photovoltaic modules to the inverter in each inverter/charge module 28.

In the embodiment of the invention shown in FIG. 1(a) and FIG. 1(c) the synchronized combination of the four current controller modules 24 and the inverter/charge inverters 28 in the four power modules 20 are configured and operate as inverters in mode I where the phase shifting transformation network 30 provides a high power AC three phase output with low total harmonic distortion value to the electrical grid in support of the electrical grid's three phase voltage and frequency.

In alternative embodiments of mode I AC three-phase output currents Ia, Ib and Ic from each of the four synchronized inverter/charge modules 28 can be supplied out-of-phase with electrical grid voltages Va, Vb and Vc by advancing or delaying the control gate pulses to gates G1 through G6 of transistors Q1 to Q6 relative to the phases of grid three phase voltage Va, Vb and Vc.

Figure 4A:
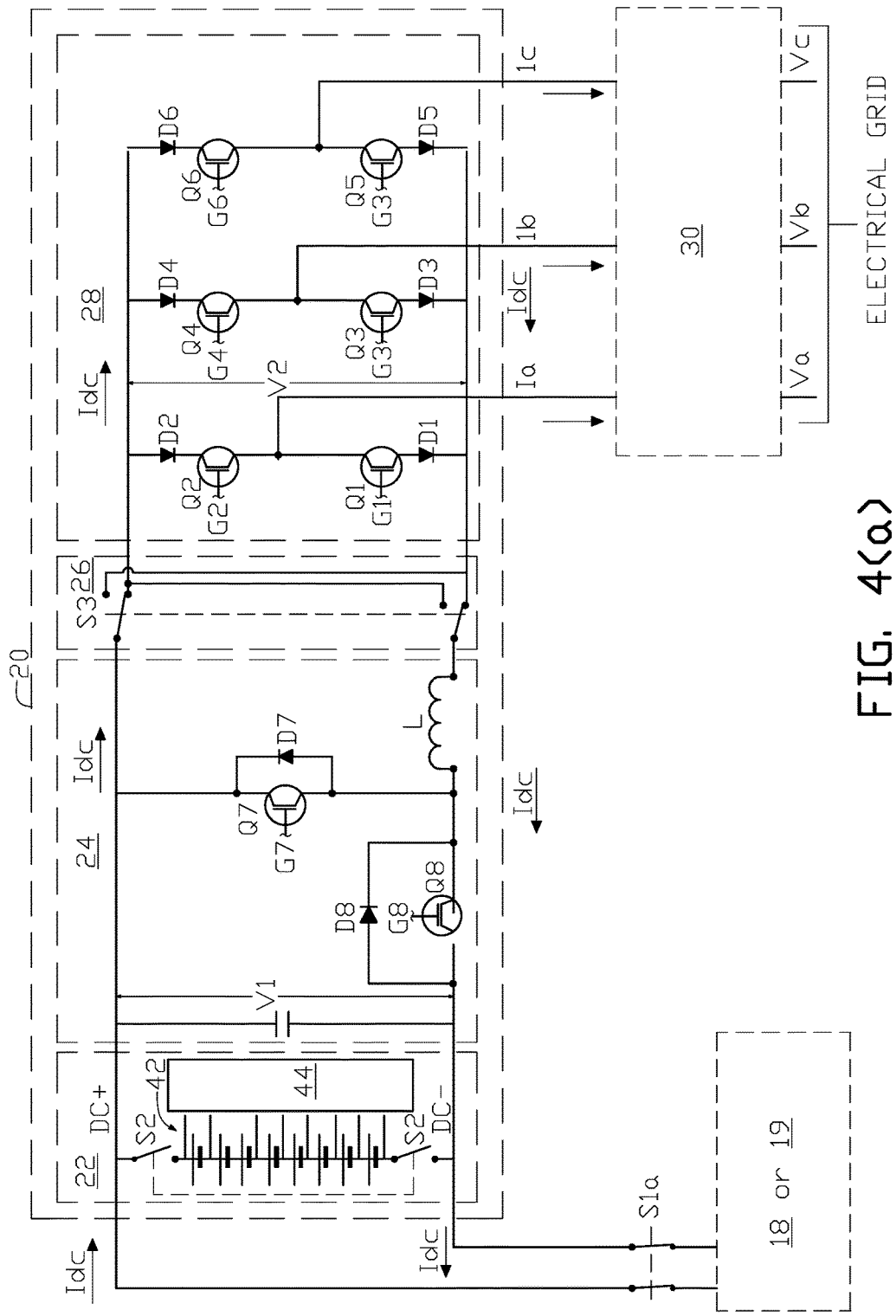
FIG. 4(a) diagrammatically illustrates one example of one of a plurality of system power modules for an integrated multi-mode, large-scale electric power support system of the present invention configured for all of the system's renewable energy DC power to be processed for delivery to the electrical grid at a leading (capacitive reactive) power factor greater than zero.
Figure 4B:
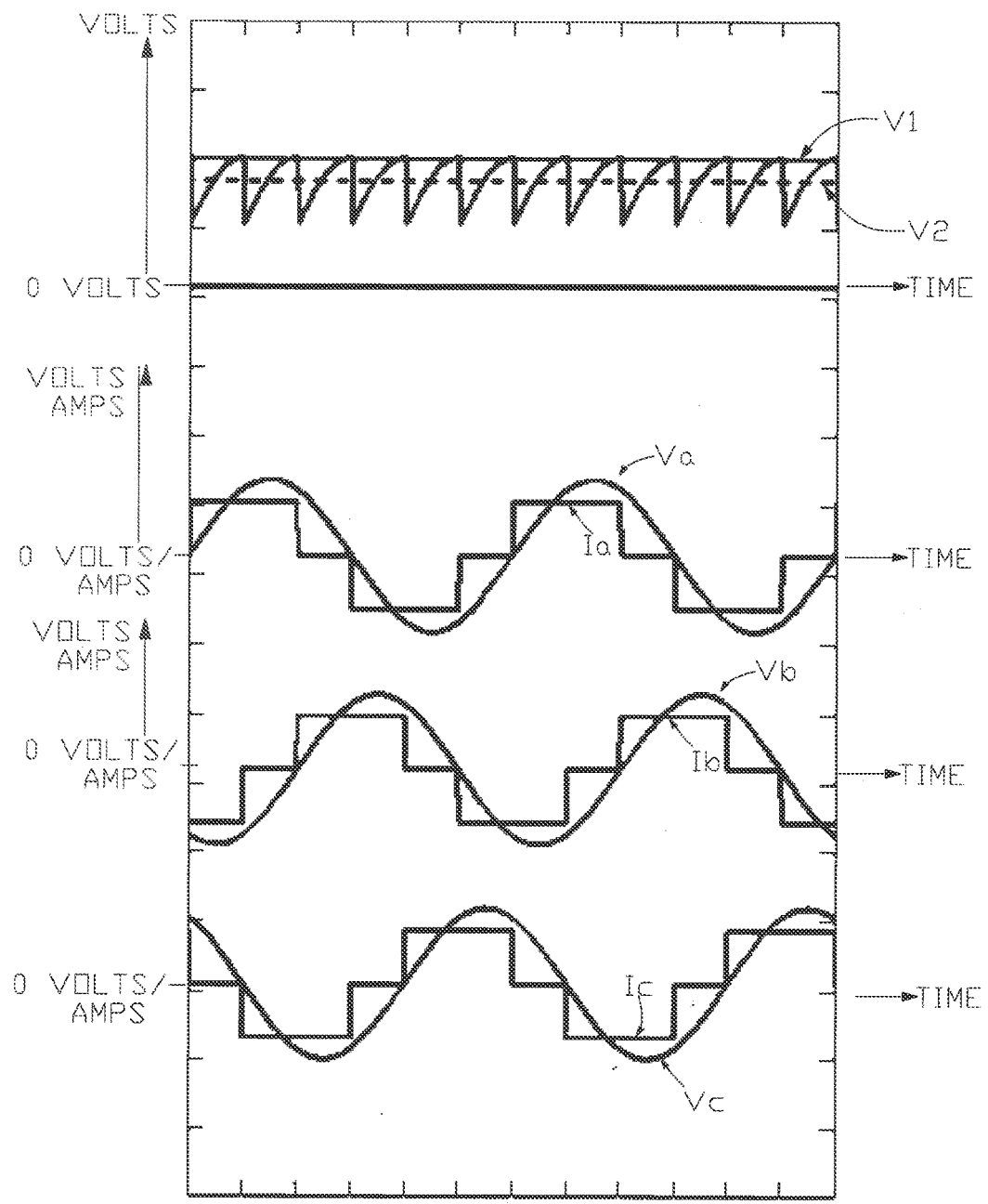
FIG. 4(b) illustrates system waveforms for the configured mode shown in FIG. 4(a).

In the alternative embodiment of mode I in FIG. 4(a) and FIG. 4(b) AC three-phase output currents Ia, Ib and Ic from each of the four synchronized inverter/charge modules 28 are leading phase-shifted from the phases of grid three phase voltage Va, Vb and Vc, respectively, by 30° and absorbing reactive power from the grid. The amount of reactive power absorbed from or injected into the grid is controlled by advancing the control gate pulses to gates G1 through G6 of transistors Q1 to Q6 relative to the phases of grid three phase voltage Va, Vb and Vc.

Figure 5A:
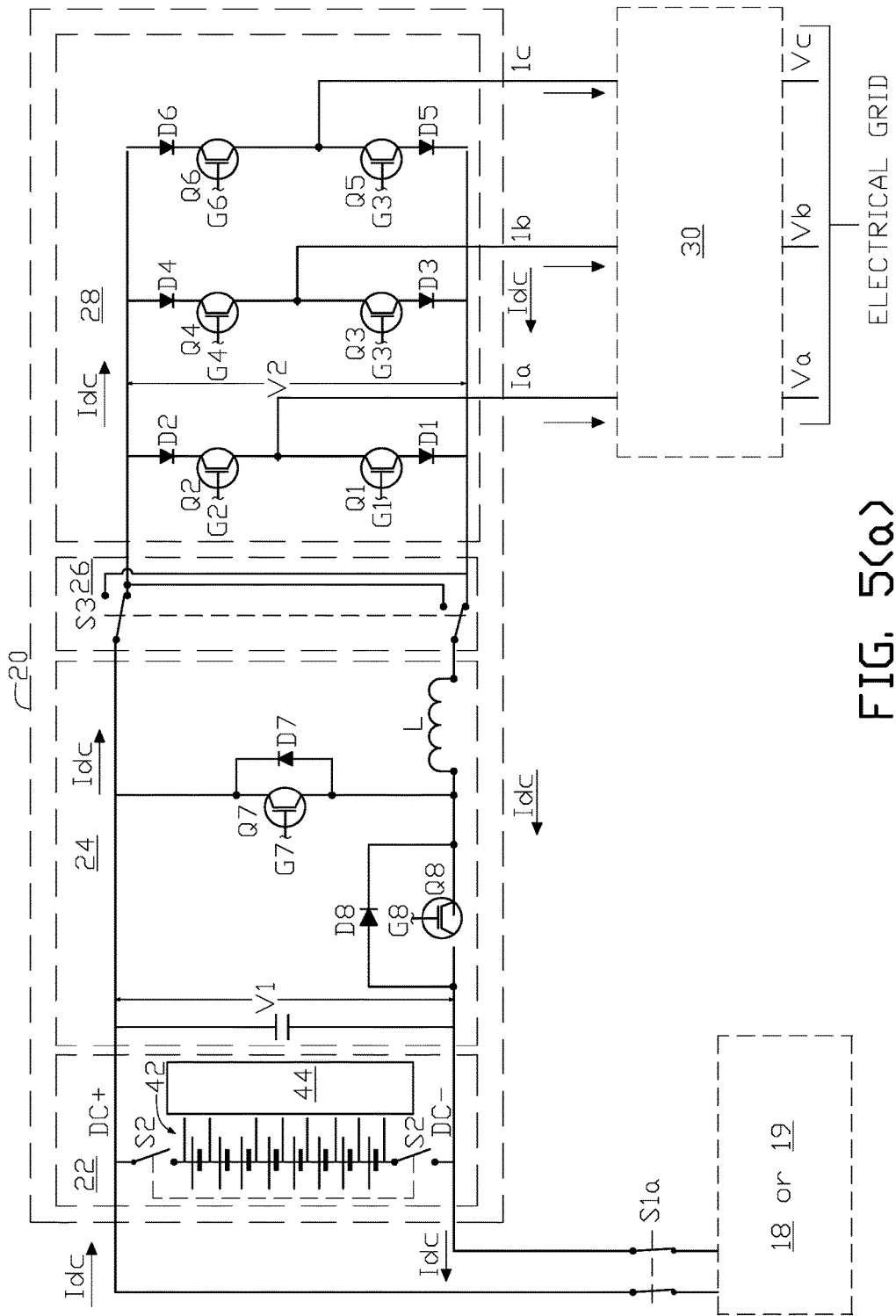
FIG. 5(a) diagrammatically illustrates one example of one of a plurality of system power modules for an integrated multi-mode, large-scale electric power support system of the present invention configured for all of the system's renewable energy DC power to be processed for delivery to the electrical grid at a lagging (inductive reactive) power factor greater than zero.
Figure 5B:
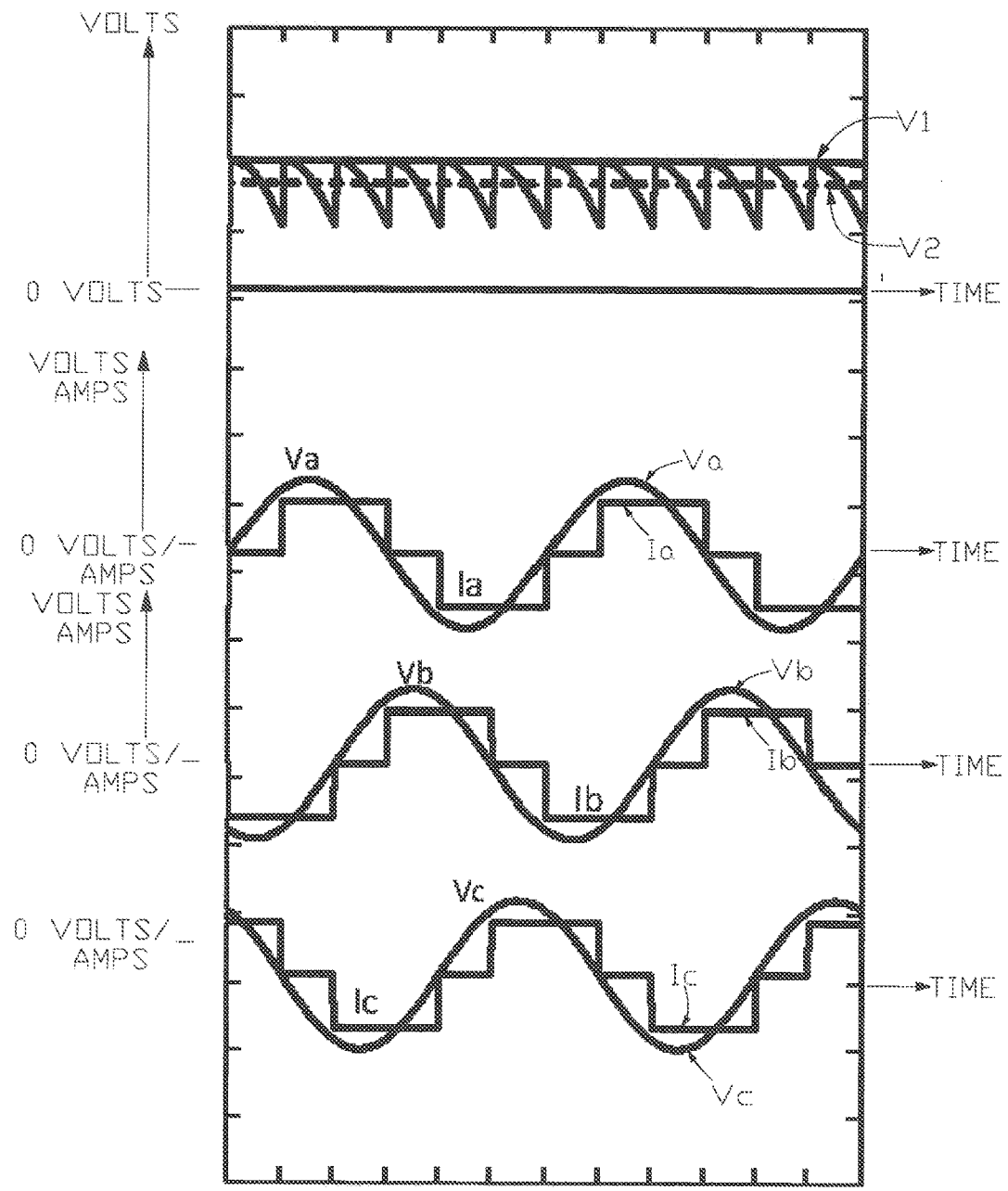
FIG. 5(b) illustrates system waveforms for the configured mode shown in FIG. 5(a).

In the alternative embodiment of mode I in FIG. 5(a) and FIG. 5(b) AC three-phase output currents Ia, Ib and Ic from each of the four synchronized inverter/charge modules 28 are lagging phase-shifted from the phases of grid three phase voltage Va, Vb and Vc, respectively, by 30° and supplying reactive power from the grid. The amount of reactive power absorbed from or injected into the grid is controlled by delaying the control gate pulses to gates G1 through G6 of transistors Q1 to Q6 relative to the phases of grid three phase voltage Va, Vb and Vc.

In the alternative embodiments of mode I in FIG. 3(b), FIG. 4(b) and FIG. 5(b) V2 (dashed line) is the average of ripple voltage on the inverter DC BUS in each of the four synchronized inverter/charge modules 28 and V1 (solid line) is the voltage on the renewable energy DC BUS of module 18. In the mode I of operation the voltage V1 on the renewable energy DC BUS is higher than the average voltage (V2) on the power module DC bus in the inverter/charge module 28 illustrating that power is supplied from the plurality of renewable energy optimized string circuits 18 to the four synchronized inverters in the four power modules 28 and from the inverters to the grid via the phase shifting transformation network 30.

Mode II: System Renewable Energy and System Battery Energy Processed and Supplied to Grid.

Figure 3C:
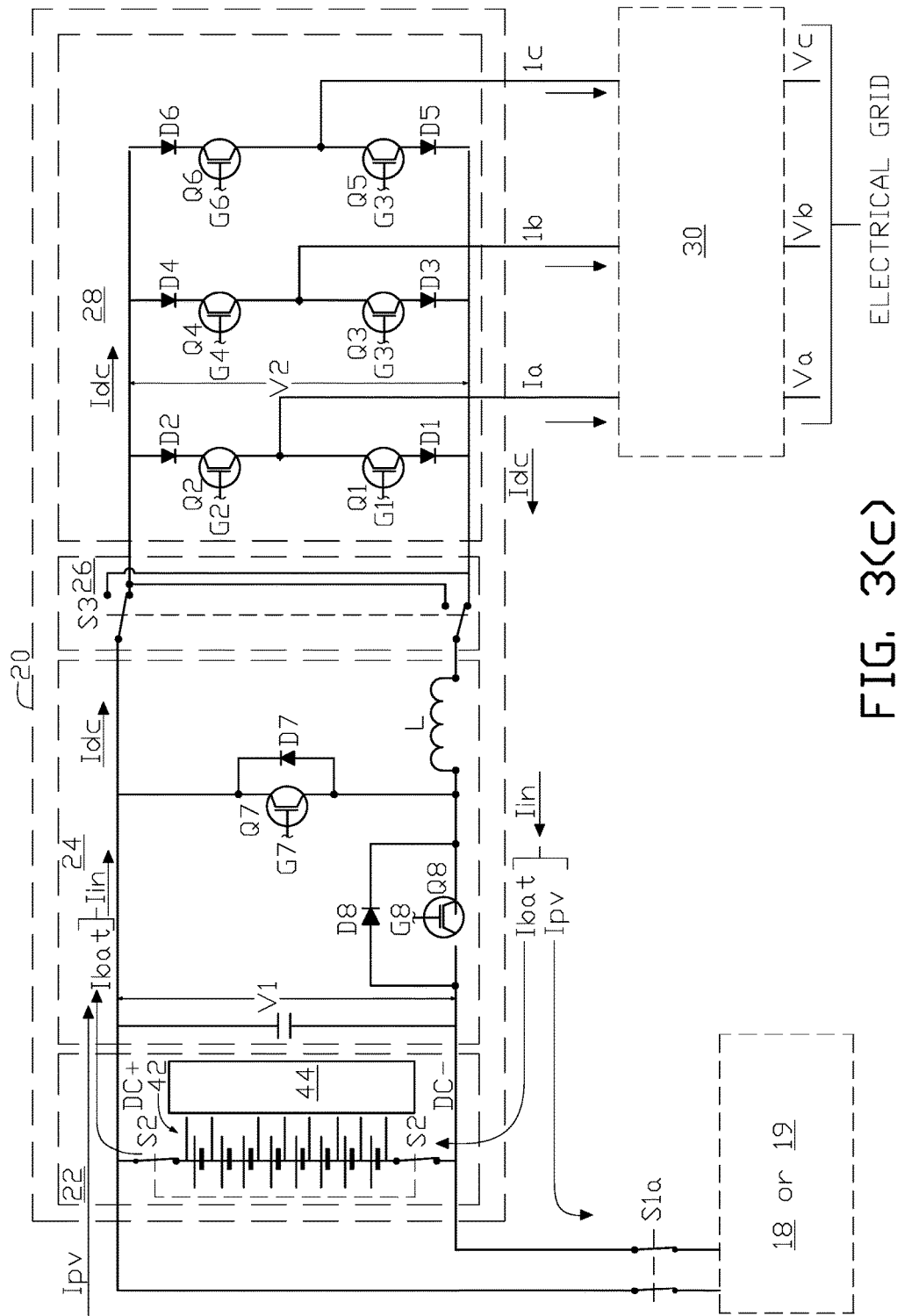
FIG. 3(c) diagrammatically illustrates one example of one of a plurality of system power modules for an integrated multi-mode, large-scale electric power support system of the present invention configured for all of the system's renewable energy DC power and stored energy DC power to be processed for delivery to the electrical grid at unity power factor.

In mode II an integrated multi-mode, large-scale electric power support system of the present invention is configured and operates in a system renewable energy power processing and grid supply mode where optimized DC power is harvested (collected) from the photovoltaic modules in the plurality of renewable energy optimized string circuits 16 and supplied to the power module DC BUS in each of the four synchronized power modules 28 as in mode I where the harvested renewable energy current (Ipv) and sums with battery discharge current (Ibat) for conversion into AC three phase by properly shifting the gate signals to transistors Q1 to Q6 power via current controller module 24 and inverter/charge module 28 (operating in the inverter mode) for supply to the electrical grid as shown in FIG. 3(c) for the first of the four identical power modules 20 in the example of the invention shown in FIG. 1(a).

Mode II is illustrated diagrammatically in FIG. 3(c) where battery switching device S2 is closed and battery 42 is connected across DC+ and DC− of the power module DC BUS. The current controller module total input current (Iin) is represented by the sum of the harvested renewable energy current (Ipv) and battery discharge current (Ibat) of battery 42. The total input current is then converted to AC three phase current via the inverter in each of the four synchronized inverter/charge module 28 (operating in the inverter mode) for supply to the electrical grid via phase shifting transformation network 30. In mode II the power support system of the present invention can support the electrical grid voltage and frequency. As in mode I, in mode II the synchronized combination of the four current controller modules 24 and the inverter/charge inverters 28 in the four power modules 20 are configured and operate as inverters in mode I where the phase shifting transformation network 30 provides a high power AC three phase output with low total harmonic distortion value to the electrical grid in support of the electrical grid's three phase voltage and frequency.

Figure 10:
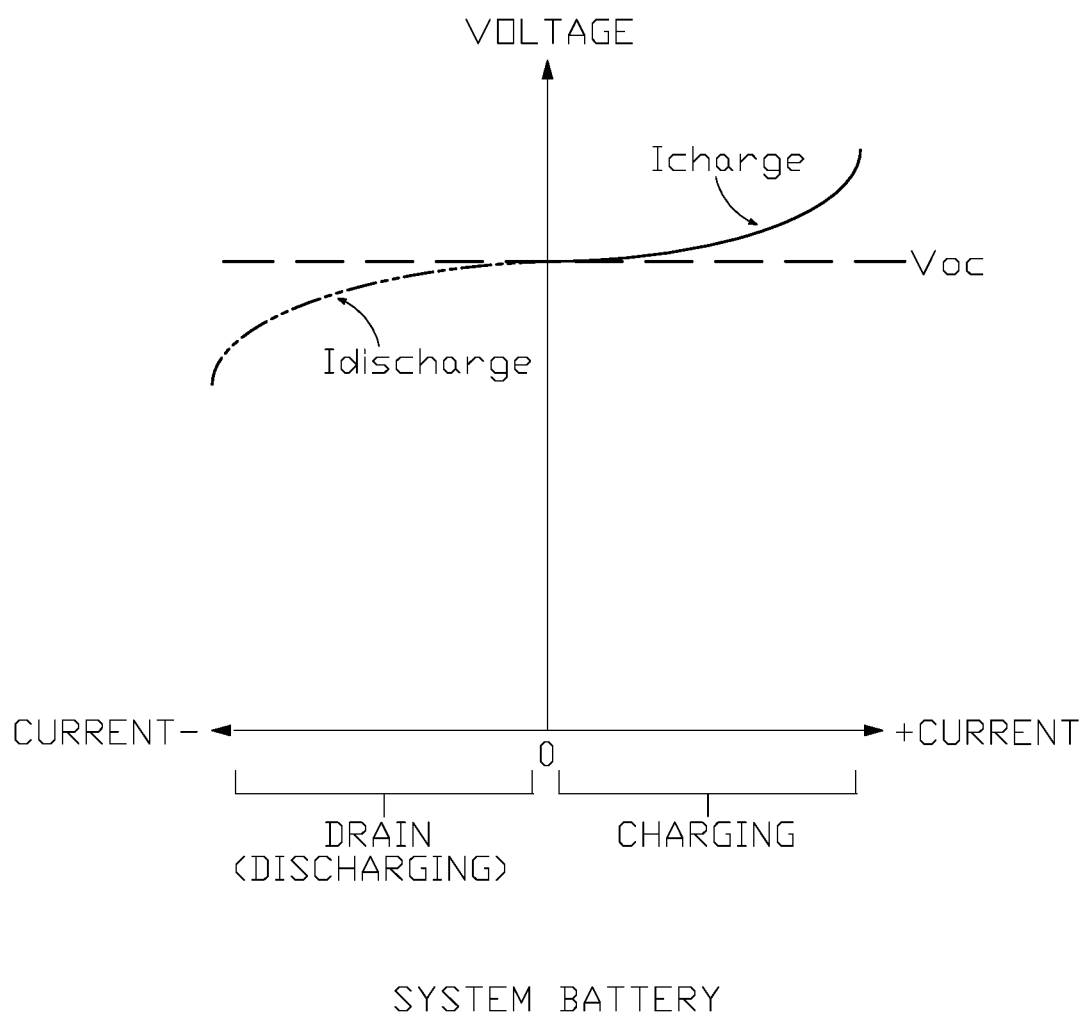
FIG. 10 graphically illustrates voltage and current characteristics for a stored energy DC power source used in an integrated multi-mode, large-scale electric power support system of the present invention.

FIG. 10 graphically illustrates current charging and discharging (draining) of the system's battery 42. When current controller module 24 demands more current than the system's renewable energy sources are capable of providing, the power module DC BUS voltage across the battery (DC+ to DC−) drops below the open circuit voltage (Voc) of the battery as shown by the dashed horizontal line in FIG. 10 and the system's battery begins to discharge (represented by the Idischarge curve to the left of zero current in the figure) with battery management system 44 operating to ensure that all battery cells are equally drained.

Mode III: System Renewable Energy Processed and Supplied for Charging the System's Stored Energy Source and to the Grid.

Figure 9A:
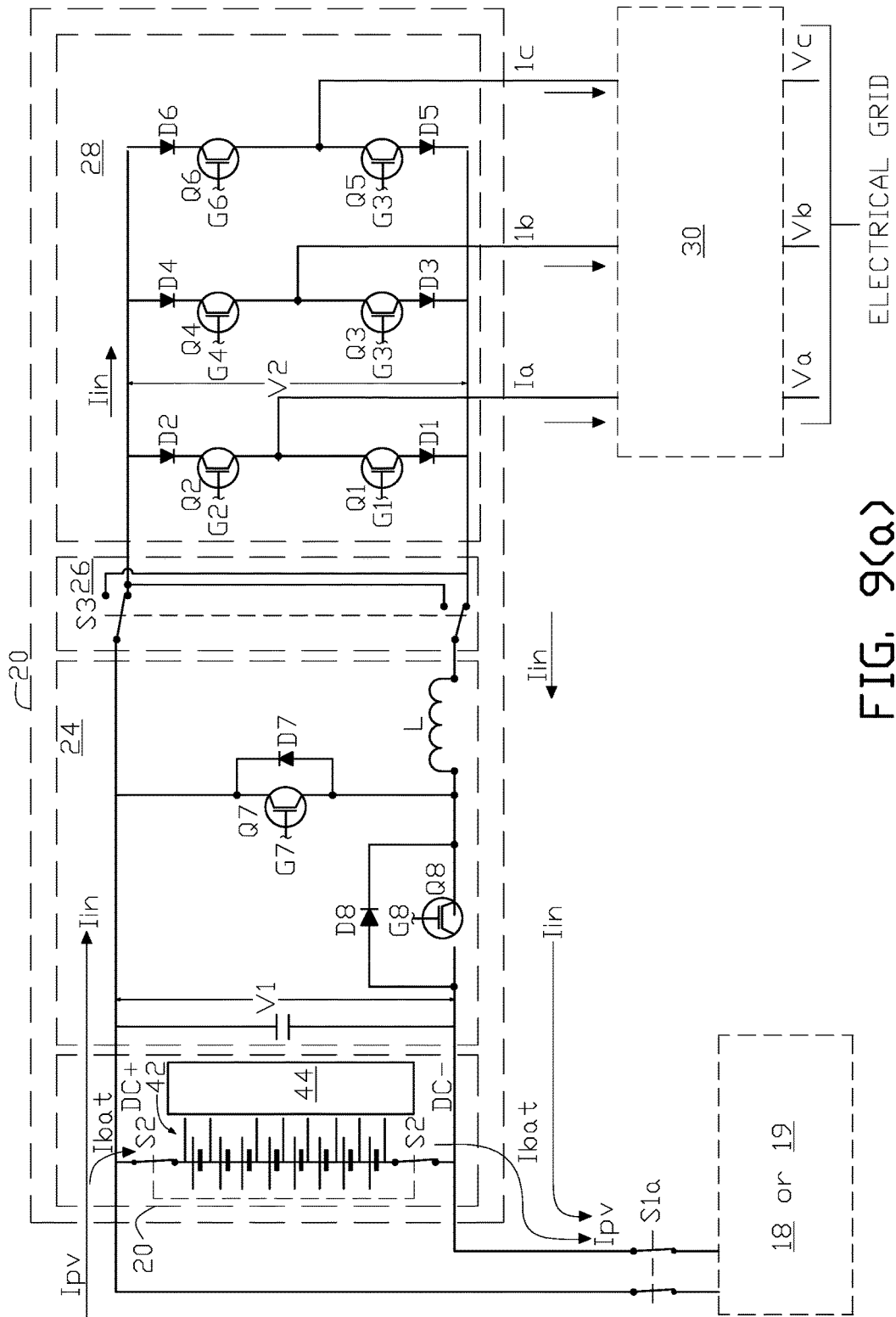
FIG. 9(a) diagrammatically illustrates one example of one of a plurality of system power modules for an integrated multi-mode, large-scale electric power support system of the present invention where the system's renewable energy DC power charges the system's stored energy DC power source and is processed for delivery to the electrical grid.

In mode III an integrated multi-mode, large-scale electric power support system of the present invention is configured and operates in a system renewable energy power processing mode where optimized DC power is harvested (collected) from the photovoltaic modules in the plurality of renewable energy optimized string circuits 16 and supplied to the power module DC BUS in each of the four power modules 28 as in mode I with the additional technical feature of a part of the harvested renewable energy current (Ipv) charges the system's battery 42 and the remainder of the harvested renewable energy is converted into AC three phase active power via current controller module 24 and inverter/charge module 28 (operating in the inverter mode) for supply to the electrical grid as shown in FIG. 9(a) for the first of the four identical power modules 20 in example of the invention shown in FIG. 1(a).

Figure 9B:
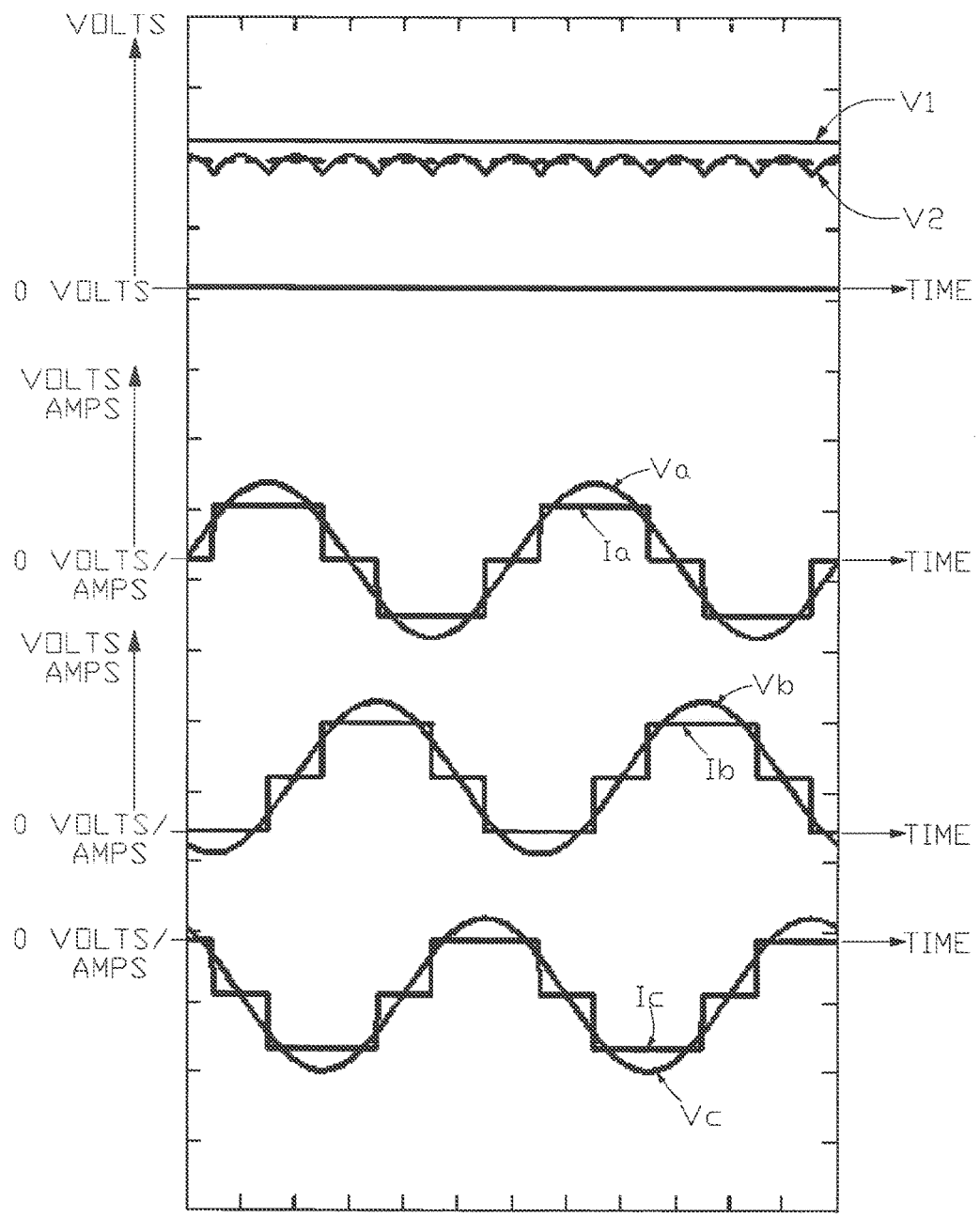
FIG. 9(b) illustrates system parameters for the operational mode shown in FIG. 9(a).

Mode III is illustrated diagrammatically in FIG. 9(a) where battery switching device S2 is closed and mode switching device S3 is in the inverter position. Current controller module 24 limits the DC current supplied to the inverter/change module 28 to a value less than the photovoltaic modules in the plurality of renewable energy optimized string circuits 16 are capable of providing and the voltage (V1 in FIG. 9(b)) across battery 42 increases above the battery's open circuit voltage (Voc in FIG. 10) and battery 42 will charge. In FIG. 9(b) the voltage (V1) on the power module DC BUS is raised by means of the current controller module 24 utilizing transistor Q8 and transistor Q7 to above the battery's open circuit voltage (Voc) across the power module DC BUS to allow battery 42 to charge.

The excess of DC current from the renewable energy source is supplied to the stored energy module 22 for charging battery 42. In mode III each power module's input DC current (Iin in FIG. 9(a)) magnitude is equal to the mathematical difference between the DC current (Ipv) magnitude harvested from the renewable energy system and the battery charging current ($I_{BAT}$). Battery management system 44 ensures that all battery cells are equally charged.

As shown in FIG. 9(b) transistors Q1 through Q6 are controlled so that AC currents Ia, Ib and Ic supplied to the grid via the phase shifting transformer network are in phase with the grid voltages Va, Vb and Vc. The DC voltage (V1) from the photovoltaic modules in the optimized string circuits is higher than the ripple voltage (V2) across the inverter's DC+ and DC− power module bus, which indicates that DC current is supplied from the photovoltaic modules (less battery charge current Ibat) to the inverter in each inverter/charge module 28. The synchronized combination of the four current controller modules 24 and the inverter/charge inverters 28 in the four power modules 20 are configured and operate as inverters in mode I where the phase shifting transformation network 30 provides a high power AC three phase output with low total harmonic distortion value to the electrical grid in support of the electrical grid's three phase voltage and frequency.

Mode IV: System's Stored Energy Source Charged from Grid Power.

Figure 8A:
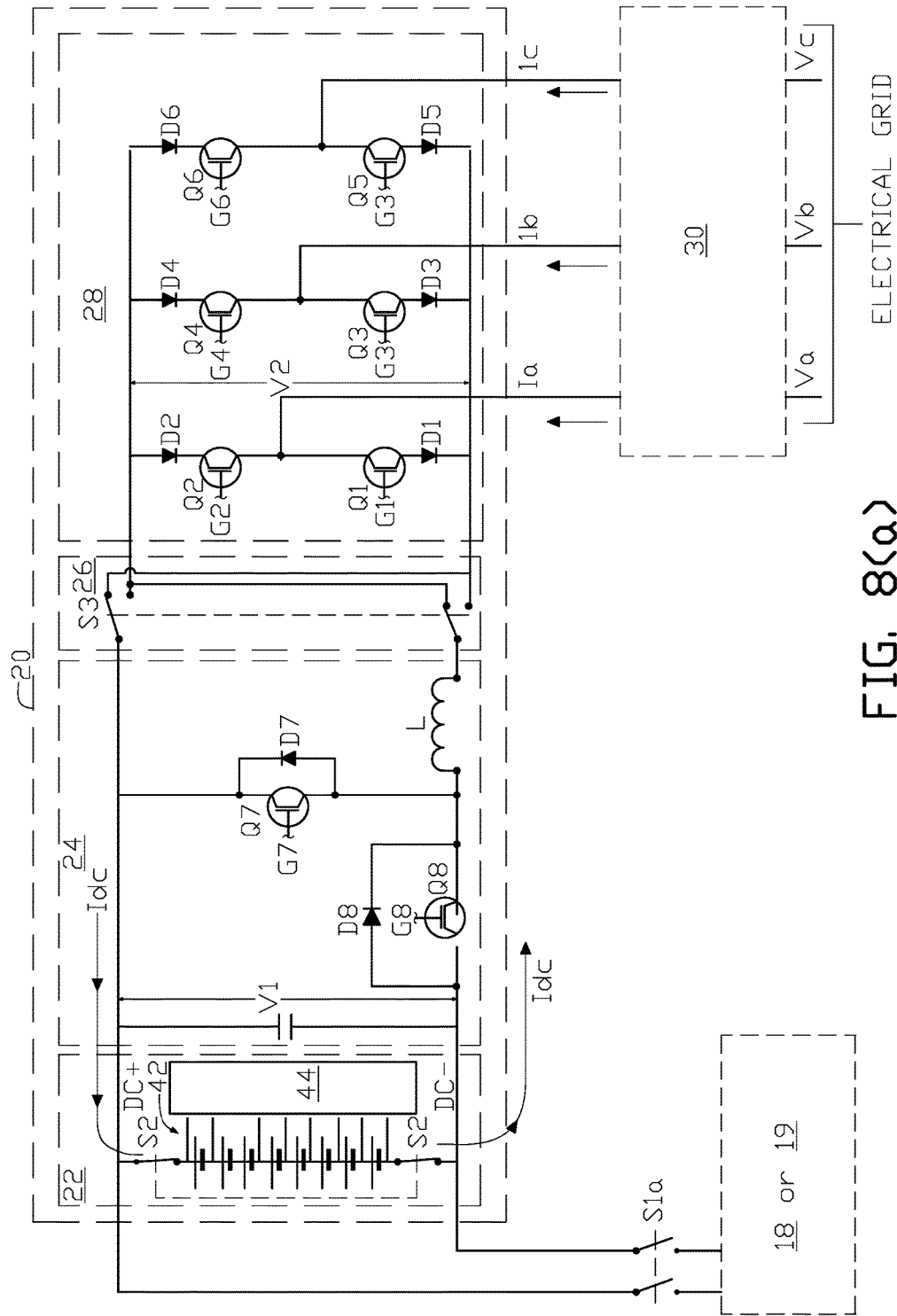
FIG. 8(a) diagrammatically illustrates one example of one of a plurality of system power modules for an integrated multi-mode, large-scale electric power support system of the present invention where the system's stored energy DC power source is recharged with AC three phase line current supplied at the AC three phase output of the system's charge/inverter module.
Figure 8B:
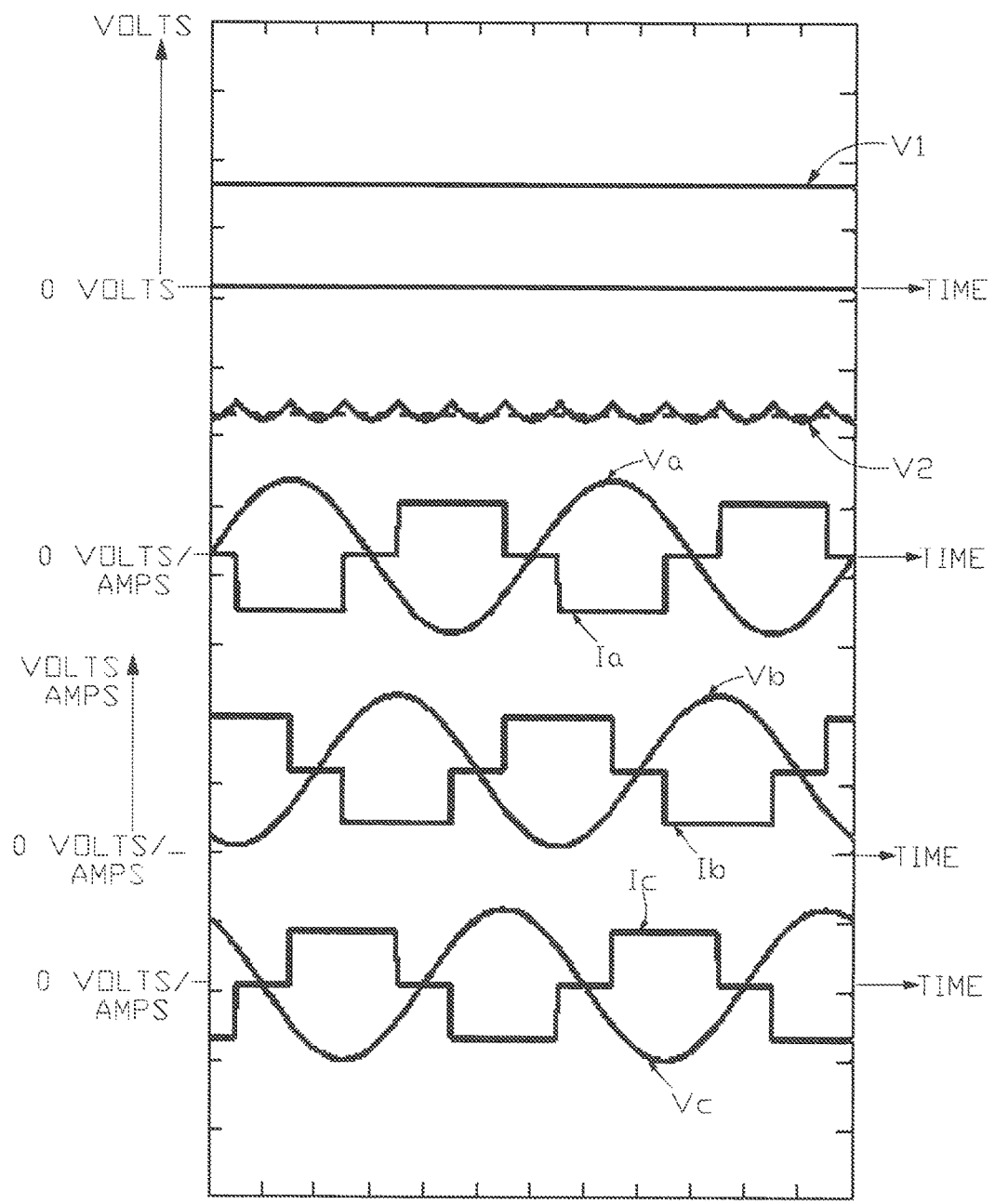
FIG. 8(b) illustrates system parameters for the operational mode shown in FIG. 8(a).

In mode IV an integrated multi-mode, large-scale electric power support system of the present invention is configured and operates without processing of the system's renewable energy power source or stored energy power source and receives AC three phase power from the electrical grid through the phase shifting transformation network 30 at the AC output of the inverter/charge module 28 (operating in the charge circuit mode) of each of the four power modules 20 for conversion of the AC three phase power into DC power that is used to charge the system's stored energy source which is battery 42 in this embodiment. As illustrated in FIG. 8(a), the first power module's input switching device S1a, and S1b, S1c and S1d for the second, third and fourth power modules in FIG. 1(a) are open so that the system's renewable energy power source is disconnected from the power modules. Stored energy module's switching device S2 is closed with battery 42 connected across the power module DC BUS in each of the four power modules. The mode switching device S3 in each of the four power modules is in the charge circuit position for polarity reversal of the power module DC BUS in the inverter/charge module 28 from the polarity when the mode switching device S3 is in the inverter position.

In mode IV transistors Q1 through Q6 in each inverter/charge module 28 are gated to provide a 180° shift in phase of the AC three phase currents Ia, Ib and Ic from grid AC voltages Va, Vb and Vc, respectively, resulting in a power and current flow from the electrical grid via the phase shifting transformation network 30 in each inverter/charge module 28 with polarity reversal of the power module DC BUS voltage (V2) when mode switching device S3 is in the charge position in each power module.

Current controller module 24 is configured and operates as a voltage boost circuit to increase the voltage across battery 42 above open circuit voltage (Voc in FIG. 10) for charging of battery 42. Battery management system 44 controls charge equalization of all battery cells.

Mode V: System Delivery of Reactive Power to the Grid or Absorption of Reactive Power from the Grid.

Figure 6A:
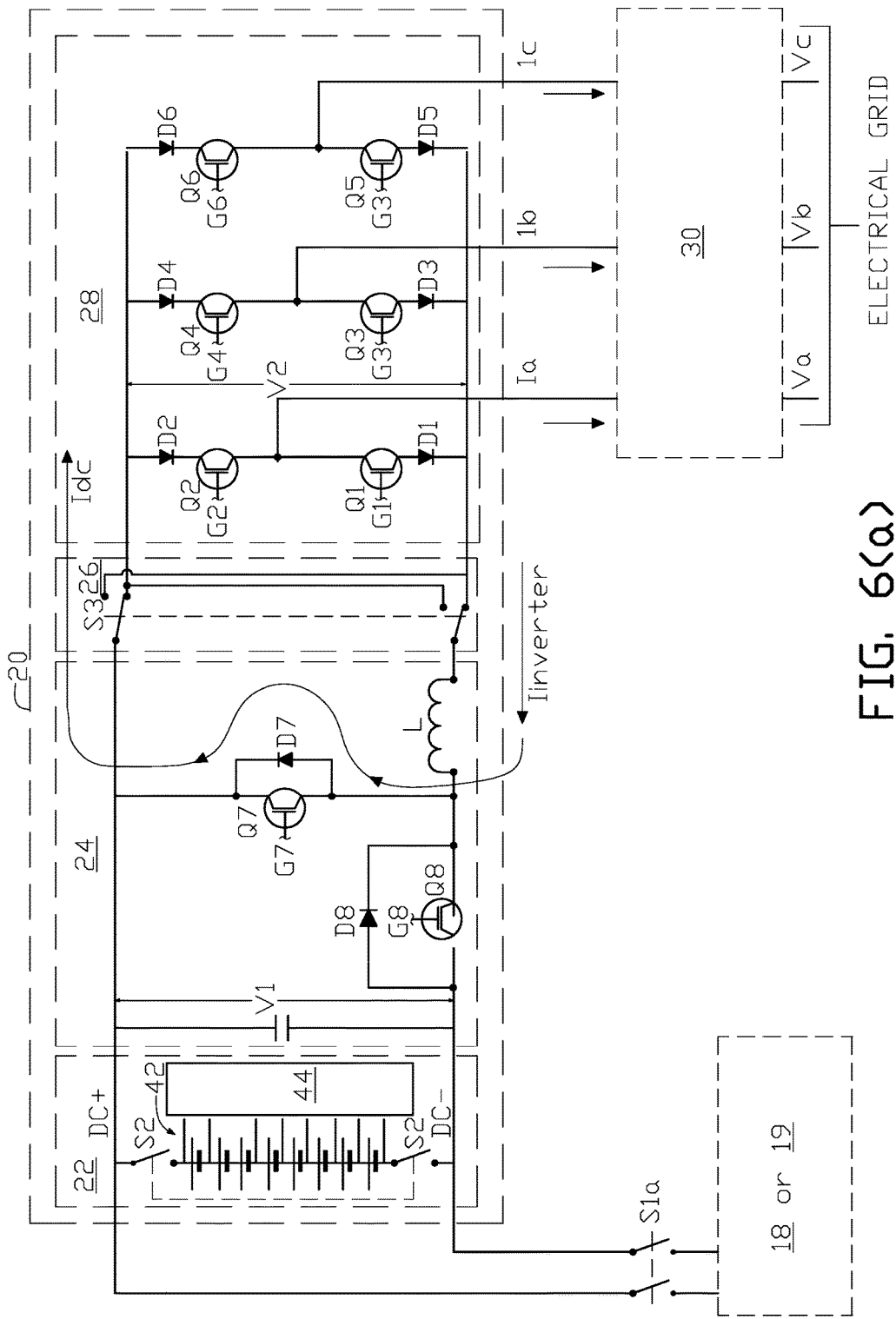
FIG. 6(a) diagrammatically illustrates one example of one of a plurality of system power modules for an integrated multi-mode, large-scale electric power support system of the present invention configured for delivery to the electrical grid a (leading) capacitive reactive power. None of the system's renewable energy DC power or stored DC energy power is delivered to the electrical grid and the system's inverter/charge module recirculates AC three phase line current supplied at the AC three phase output of the large-scale electric power support system.
Figure 6B:
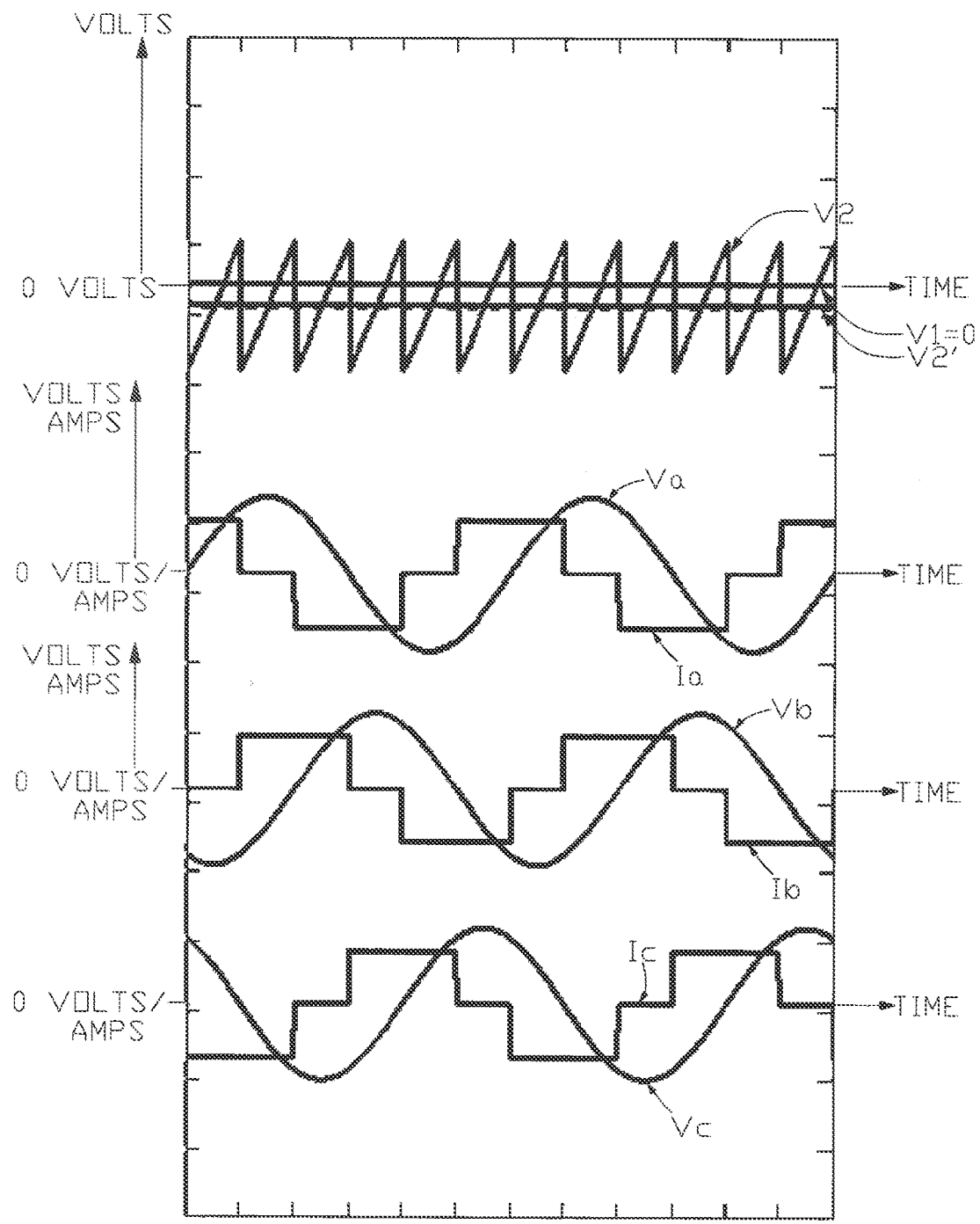
FIG. 6(b) illustrates system waveforms for the configured mode shown in FIG. 6(a).

In mode V an integrated multi-mode, large-scale electric power support system of the present invention is configured and operates without processing of the system's renewable energy power source or stored energy power source and is a low power consumption reactive power generator supply to the grid. As illustrated in FIG. 6(*a*), the first power module's input switching device S1*a*, and S1*b*, S1*c* and S1*d* for the second, third and fourth power modules in FIG. 1(*a*) are open with the system's renewable energy power source is disconnected from the power modules. Stored energy module's switching device S2 is open with battery 42 disconnected from the power module DC BUS in each of the four power modules and mode switching device S3 in each of the four power modules is in the inverter position.

Mode V leading power factor waveforms in FIG. 6(*b*) illustrate that transistors Q1 through Q6 in each of the four synchronized inverter/charge modules 28 are gated to provide a leading shift in phase of +90° in AC three phase currents Ia, Ib and Ic supplied to the grid from the inverter's output in each of the four synchronized inverter/charge modules 28 relative to the phasing of the grid voltages Va, Vb and Vc respectively. With reference to Equation 2 the power support system of the present invention generates and consumes reactive power (Q) is absorbed from the grid. The inverter/charge module DC bus voltage (V2) in each of the four synchronized power modules is a positively sloped saw-tooth waveform with a slightly negative average value (V2') indicating that a negligible amount of active power is consumed from the grid to compensate for the power losses in each power module 28. This feature may be used to compensate for reactive power generated on the grid for example, by induction motors associated with some types of wind-turbines connected to the grid.

Figure 7A:
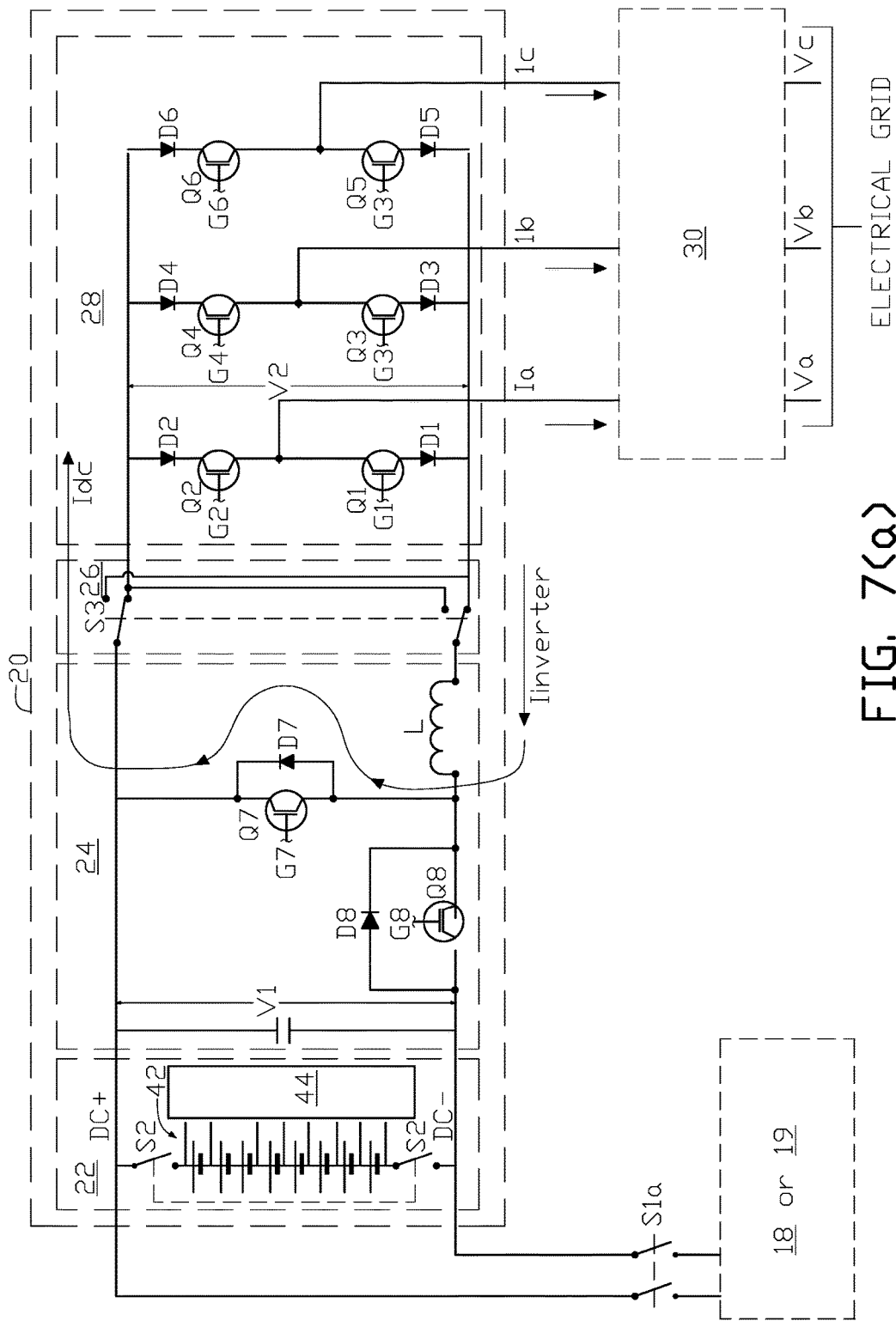
FIG. 7(a) diagrammatically illustrates one example of one of a plurality of system power modules for an integrated multi-mode, large-scale electric power support system of the present invention configured for absorbing from the electrical grid (lagging) inductive reactive power. None of the system's renewable energy DC power or stored DC energy power is delivered to the electrical grid and the system's inverter/charge module recirculates AC three phase line current supplied at the AC three phase output of the large-scale electric power support system.
Figure 7B:
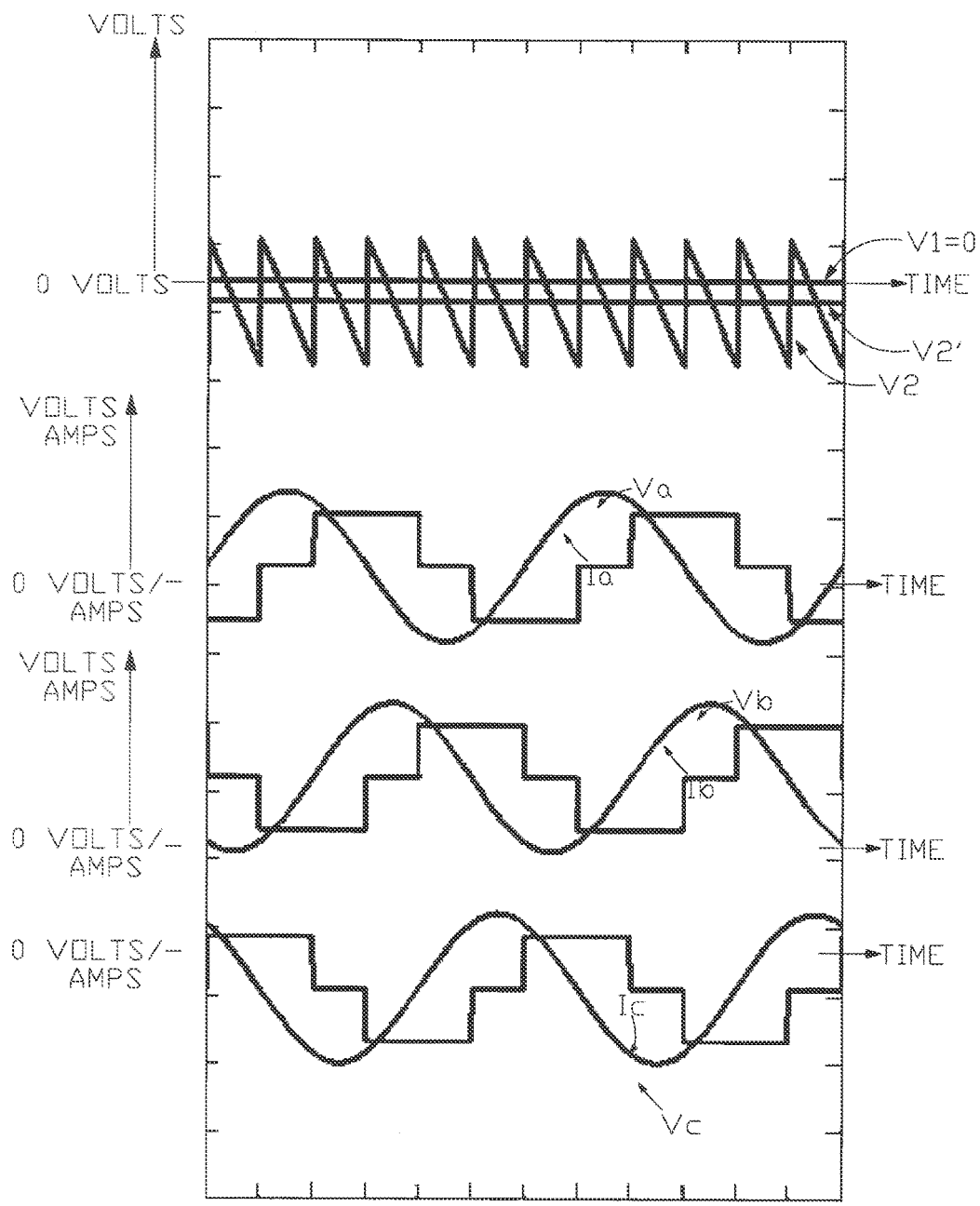
FIG. 7(b) illustrates system waveforms for the configured mode shown in FIG. 7(a).

Mode V lagging power factor configuration in FIG. 7(*a*) is identical to that for mode V leading power factor configuration in FIG. 6(*a*).

Mode V lagging power factor waveforms in FIG. 7(*b*) illustrate that transistors Q1 through Q6 in each of the four inverter/charge modules 28 are gated to provide a lagging shift in phase of −90° in AC three phase currents Ia, Ib and Ic supplied to the grid from the inverter's output in each of the four synchronized inverter/charge modules 28 relative to the phasing of grid voltages Va, Vb and Vc respectively. With reference to Equation 2 the power support system of the present invention absorbs reactive power from the grid by shifting gate signals −90° behind the grid phase voltages. The inverter/charge DC BUS voltage (V2) is a negatively sloped saw-tooth waveform with a slightly negative average value (V2') indicating that a negligible amount of active power is consumed from the grid to compensate for the power losses in power module 20.

In other embodiments of an integrated multi-mode large-scale electric power support system of the present invention for an electrical grid the synchronized combination of the current controller module 24 and the inverter/charge inverter 28 in each of the four power modules 20 can be configured and operated as one switch mode (pulse width modulated) voltage source inverter in each one of the four power modules in modes I, II and III in place of the four regulated current source inverters as disclosed above. In modes IV and V each power module 20 with a switch mode voltage source inverter is modified to accommodate the grid charging of the stored energy device in mode IV and the grid reactive power delivery or absorption of mode V as in the embodiments of the invention described above.

In all embodiments of the integrated multi-mode large-scale electric power support system of the present invention a multi-mode controller comprised of one or more control components is provided for controlling a selection of each one of the plurality of system modes described herein for the integrated multi-mode, large-scale electric power support system in response to a system mode request inputted to the multi-mode controller from the electrical grid. The controller may be implemented as a state machine (computer) where each of the modes I through V represents a different state, invoked at proper conditions. For example: mode I when the output demand is equal to available alternative power; mode II when the output demand is greater than available alternative power; mode III when the available alternative is greater than power output demand and extra power can be stored; mode IV when there is low grid demand for alternative power typically at night; grid power is used to charge storage batteries. Mode V when no active power is needed, and only reactive power is needed and all DC sources are disconnected.

As used in the present invention low voltage DC (LVDC) refers to a DC voltage range of 1,000 volts (1.0 kVDC) to 1,500 VDC (1.5 kVDC); medium voltage DC (MVDC) refers to a DC voltage range of 2,000 VDC (2.0 kVDC) to 4,000 VDC; and high voltage DC (HVDC) refers to a DC voltage of 10,000 VDC (10 kVDC) or greater.

The embodiments of an integrated multi-mode large-scale electric power support system for an electrical grid of the present invention configured and operating in multi-modes I through V is preferable in a LVDC or MVDC system with respect to the voltage level of the renewable energy BUS and the power module BUS where the system's co-located renewable energy power source has a power capacity preferably in the range of 2,500 kW to 10,000 kW.

For applications of an integrated multi-mode large-scale electric power support system for an electrical grid of the present invention where the co-located renewable energy power source (either solar or wind, or a combination thereof) with a minimum capacity of 50,000 kW (50 megawatts) the required length of cables between the renewable energy BUS and a centrally located power module BUS can result in degradation of the power support system's performance in the embodiments of the present invention configured and operating in multi-modes I through V. To mitigate loss of DC transmission power in these very large installations of 50 megawatts or greater, embodiments of an integrated multi-mode large-scale electric power support system of the present invention can preferably utilize a HVDC bus transmission between the renewable energy power sources and the DC power processing components, including DC-to-AC converters, for injection of AC three phase power into the electrical grid. The selection of a minimum voltage of 10.0 kVDC for the HVDC bus is based upon a typical maximum rating of components used in a photovoltaic power station or a wind farm.

Figure 11:
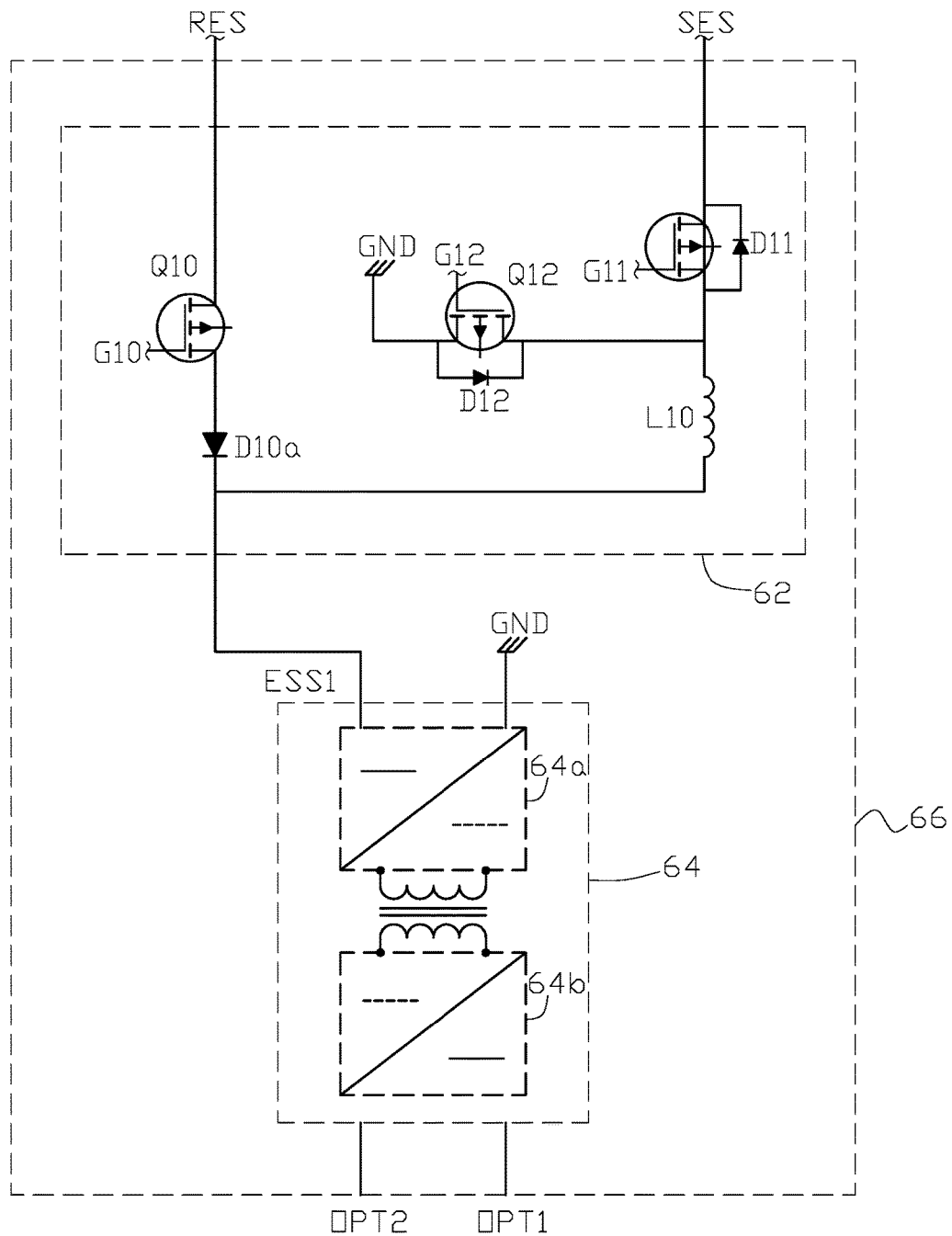
FIG. 11 illustrates one example of a high voltage mode transfer switch and optimizer module utilized in one example of an integrated multi-mode, large-scale electric power support system of the present invention where a high voltage dc bus is utilized.
Figure 12:
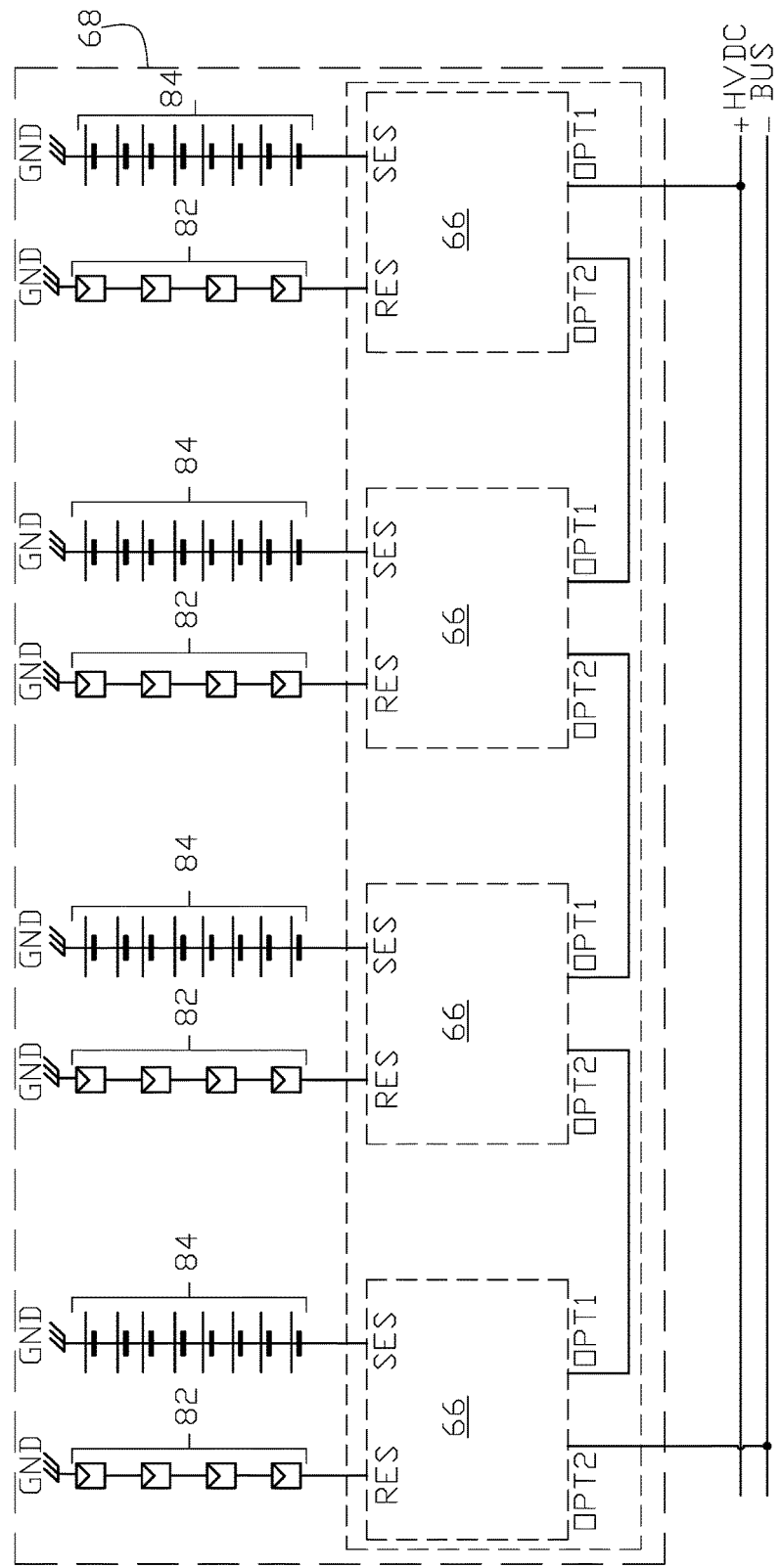
FIG. 12 illustrates one example of a high voltage switchable solar energy DC power source and stored energy DC power source subsystem utilizing four of the high voltage transfer switch and optimizer modules shown in FIG. 11 in one example of an integrated multi-mode, large-scale electric power support system of the present invention where a high voltage dc bus is utilized.
Figure 13:
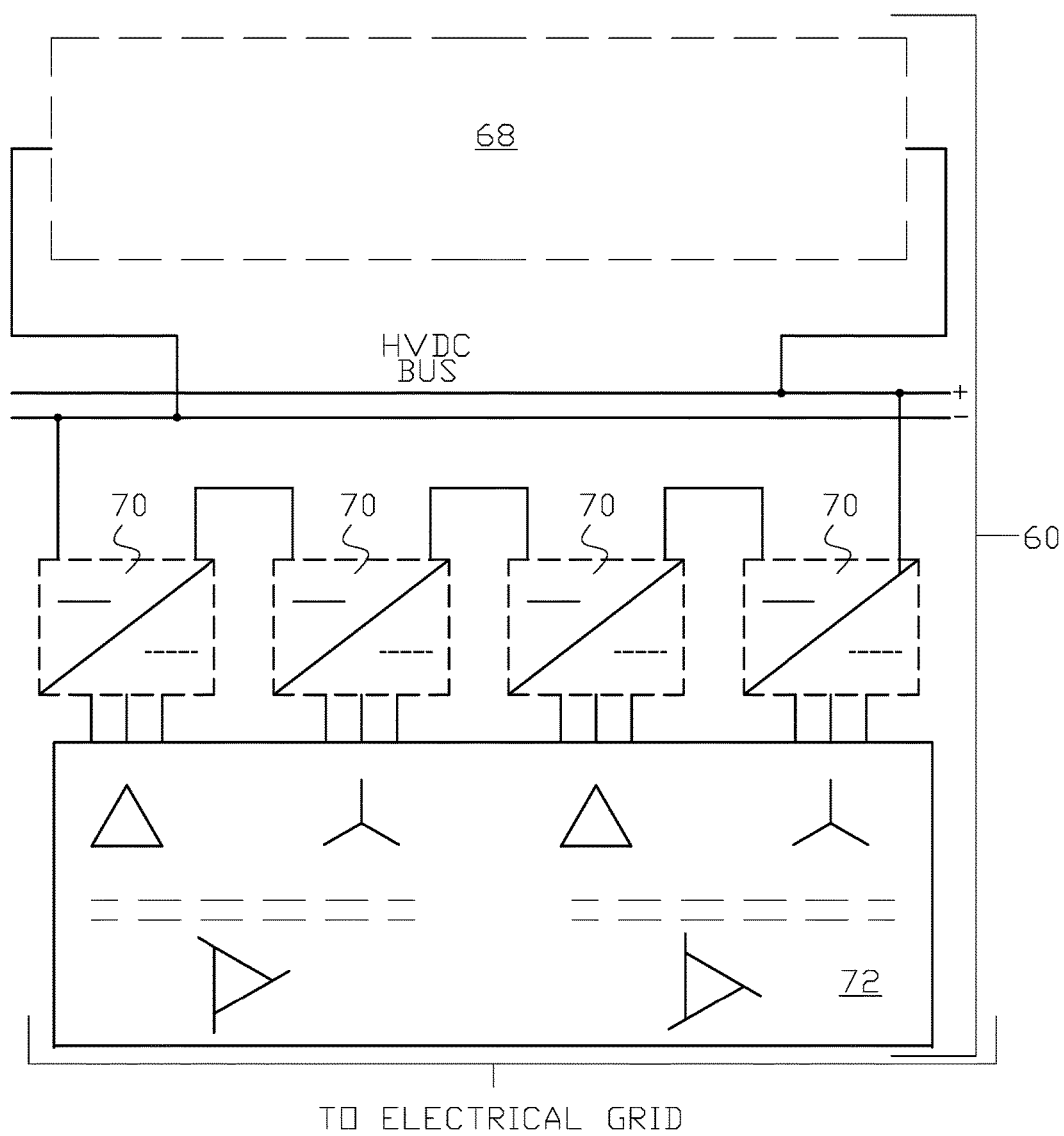
FIG. 13 illustrates one example of an integrated multi-mode, large-scale electric power support system of the present invention with a high voltage dc bus utilizing the switchable solar energy source and battery energy source subsystem shown in FIG. 12.

FIG. 11 through FIG. 13 illustrate one embodiment of an integrated multi-mode, large-scale electric power support system 60 of the present invention for an electrical grid where the renewable energy source (RES) is solar energy and comprises (as shown in FIG. 12) a plurality of strings of low voltage photovoltaic modules 82 and a plurality of DC stored energy modules which in this embodiment of the invention comprise battery 84 and a battery maintenance system (not shown in the drawing). DC power from the renewable energy power source and the DC stored energy power source is transmitted via HVDC BUS which represents a high voltage DC power transmission link in FIG. 12 and FIG. 13 to DC-to-AC inverters 70 in FIG. 13.

In other embodiments the renewable energy power source can be wind energy comprising a plurality of wind renewable energy turbine power electronic blocks comprising a wind turbine and a wind turbine controller having, in addition to other components, an AC-to-DC rectifier for supply of DC power, or a combination of solar and wind renewable energy.

In other embodiments of the invention the wind energy source may be a wind turbine driven generator assembly having an AC synchronous generator output connected to an input of an AC-to-DC rectifier having an AC to DC rectifier output.

U.S. Pat. No. 8,212,408, which is incorporated herein by reference in its entirety, discloses a system for collection of wind-generated renewable energy DC electric power in a multiple nodal arrangement where the DC output current of each node is held constant while the DC output node voltage is allowed to vary. The DC outputs from the wind-generated power collection nodes are connected together in series and fed to a plurality of regulated current source inverters via a high voltage DC transmission link. Each inverter converts input DC power into a three phase AC output. The AC outputs of the regulated current source inverters are connected to a phase shifting transformation network that supplies three phase electric power to a conventional AC electrical transmission system. Alternatively wind-generated and photovoltaic-generated electric power is commonly collected in a nodal arrangement and transported at high voltage DC to a plurality of regulated current source inverters for supply to a conventional AC electrical transmission system.

One embodiment of an integrated high voltage, multi-mode large-scale electric power support system of the present invention for an electrical grid utilizes a plurality of solid state energy state energy state switches (ESS) which is illustrated in FIG. 11 as ESS 62. Each ESS has an ESS output comprising ESS1 which is inputted to one of a plurality of HV power optimizers 64 as shown in FIG. 11. In this non-limiting embodiment of the DC power optimization module 66 in FIG. 11 the HV power optimizer 64 also has an input reference to electrical ground potential GND. The two inputs to each ESS is one of the plurality of renewable energy source (RES) string circuits and one of plurality of (SES) batteries 84.

In the embodiment of the invention shown in FIG. 11, FIG. 12 and FIG. 13 the renewable energy source string circuit 82 comprises a plurality of photovoltaic modules with terminal connection referenced to electrical ground potential and the stored energy source circuit comprises battery 84 with terminal connection referenced to electrical ground potential as shown in FIG. 12. In other embodiments of the invention the renewable energy source string circuit 82 may comprise a wind turbine and a wind turbine controller having, in addition to other components, an AC-to-DC rectifier for supply of DC power.

The ESS for each of the plurality of power optimization modules 66 transfers among three system configurations and operational states, namely (1) RES DC power delivery to the HVDC BUS; (2) RES power charging the SES; and (3) SES and RES DC power delivery to the HVDC BUS. Optionally all of the energy state switches in the plurality of power optimization modules 66 may be synchronized to operate in the same operational state or in separately selected states depending upon DC power demand at the HVDC bus by the electrical grid or the charge state of battery 84 in a particular one of the plurality of power optimization modules; for example, battery 84 in selected ones of the plurality of power optimization modules may require recharging in operational state (2) while the remaining ones of the plurality of power optimization modules may be sufficient to provide DC power to the HVDC BUS to meet the electrical grid's power demand in a combination of modes (1) and (3).

In operational state 1 switch transistor Q10 is closed and switch transistors Q11 and Q12 are open so that the low voltage, for example, 1.0 kV volts power of the renewable energy source is supplied to the HV power optimizers 64 and the DC-to-DC converters forming part of the HV power optimizers transforms the low voltage to a medium voltage, for example, 2.5 kV to the HVDC bus as further described in U.S. Pat. No. 8,212,408 for the node-isolated step-down current regulators 106 used in the multi-nodal renewable energy collection system.

In operational state 2 switch transistor Q10 is closed; switch transistor Q11 is open; and switch transistor Q12 is pulsed at rate of 50 kHz to 100 kHz so that switch transistor Q12, inductor L10 and diode D11 form a voltage boost circuit to charge battery 84 at a charge rate determined by the duty cycle of switch transistor Q12.

In operational state 3 switch transistor Q10 is closed, Q12 is open and Q11 is pulsed to form a buck current converter to control SES current from battery 84 to discharge with delivery of stored energy DC power in addition to the renewable energy DC power from RES to the HVDC BUS.

Each of the plurality of HV power optimizers 64 has an optimizer output OPT1 and OPT 2 with galvanic isolation of the renewable energy sources and the stored energy sources from the HVDC BUS by galvanic isolation provided between the input and output circuits of the HV power optimizer. Galvanic isolation between the input inverter and output inverter in each of the plurality of DC-to-DC converters use the HV power optimizers 64 to connect the outputs (OPT2 and OPT2) of each of the HV power optimizers in series to quadruple the output voltage magnitude of each HV power optimizer that is connected to the HVDC BUS.

ESS 62 and HV power optimizer 64 form a DC power optimization module 66 as shown in FIG.11 can be configured as a plurality of DC power optimization modules 66 connected together in a series string electrical circuit to a HVDC BUS as shown, for example, in FIG. 12 where four power optimization modules 66 are connected together in a series string electrical circuit to the HVDC BUS. In FIG. 12 the renewable energy string circuits 82, the battery 84 circuits and the DC four power optimization modules 66 form a HVDC power module 68 that is connected to the HVDC BUS as shown in FIG. 13.

In FIG. 13 four series interconnected HV DC-to-AC three phase inverters 70 are also connected to the HVDC BUS. The synchronized outputs of the four HV DC-to-AC three phase inverters are connected to a phase shifting transformation network 72 which in turn are connected to the electrical grid. Selection of the HV DC-to-AC three phase inverters are as in other embodiments of an integrated multi-mode, large-scale electric power support system of the present invention such as the DC-to-AC three phase inverters in power modules 20.

Selection of phase shifting transformation network 72 is similar to that for other phase shifting transformation networks in other embodiments of an integrated multi-mode, large-scale electric power support system of the present invention such as phase shifting transformation network 30.

Figure 14:
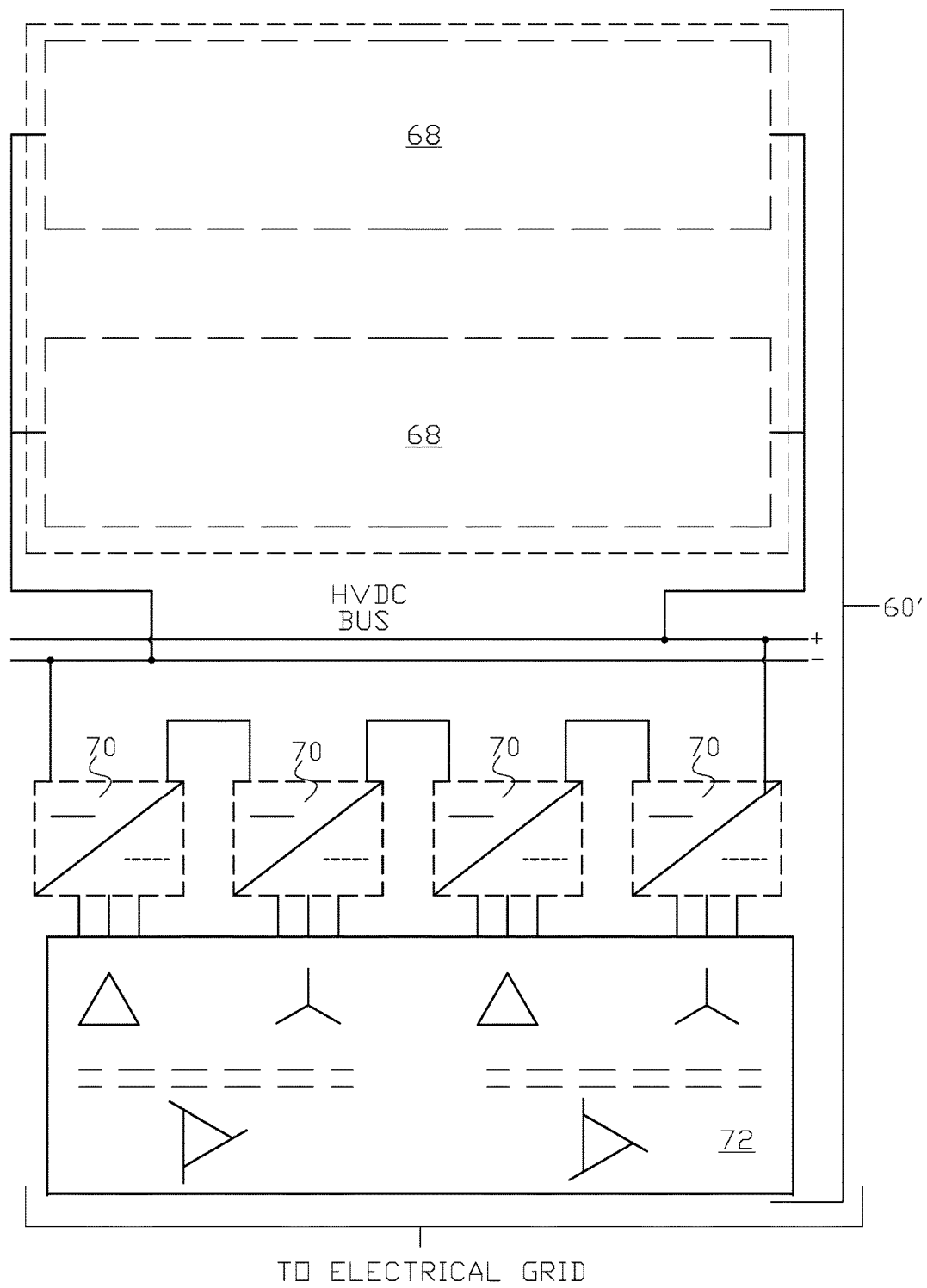
FIG. 14 is another example of an integrated multi-mode, large-scale electric power support system of the present invention suitable for high voltage power support systems utilizing the high voltage switchable solar energy source and battery energy source subsystem shown in FIG. 12.
Figure 15:
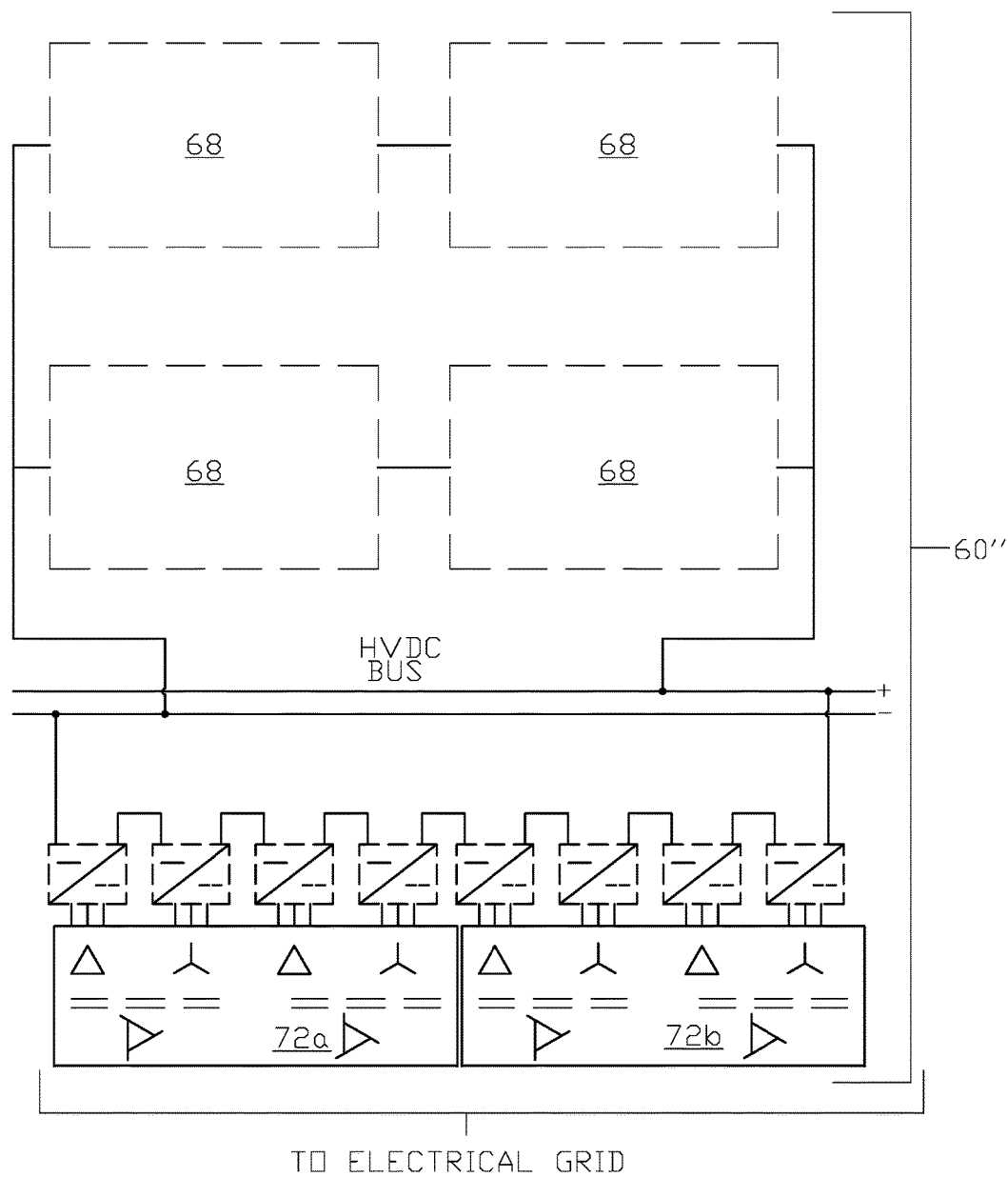
FIG. 15 is another example of an integrated multi-mode, large-scale electric power support system of the present invention suitable for high voltage power support systems utilizing the high voltage switchable solar energy source and battery energy source subsystem shown in FIG. 12.

In other embodiments of a high voltage integrated multi-mode, large-scale electric power support system of the present invention to achieve a higher HVDC magnitude at the HVDC BUS, multiple HVDC power modules 68 can be connected in series, parallel or combinations of series and parallel arrangements. For example in system 60' in FIG. 14 a pair of HVDC power modules 68 are connected in parallel across the HVDC BUS with four series interconnected HV DC-to-AC three phase inverters 70 connected in parallel across the HV DC BUS with the output of the inverters connected to phase shifting transformer network 72 to the electrical grid. In system 60" in FIG.15 two series connected pairs of HVDC power modules 68 are connected in parallel across HVDC BUS with the four series interconnected HV DC-to-AC three phase inverters are connected in parallel across the HV DC BUS with the output of the inverters connected to phase shifting transformer networks 72a and 72b to the electrical grid. A bank of eight DC to AC three phase inverters are connected together in series across HV DC BUS in FIG. 15 with a first set of four inverters having outputs connected to phase shifting transformer networks 72a and a second set of four inverters having outputs connected to phase shifting transformer networks 72b. Each of the two phase shifting networks 72a and 72b can be selected as in other embodiments of an integrated multi-mode, large-scale electric power support system of the present invention.

In all embodiments of the high voltage integrated multi-state large-scale electric power support system of the present invention a multi-state controller comprised of one or more control components is provided for controlling a selection of each one of the plurality of system states described herein for the high voltage integrated multi-state, large-scale electric power support system in response to a system state request inputted to the multi-state controller from the electrical grid. The controller may be implemented as a state machine (computer) where each of the states 1 through 3 represents a different state, invoked at proper conditions. For example: state 1 when the output power demand from the electrical grid to the power support system of the present invention is equal to or less than the available renewable energy power from the power support system; state 2 when there is no grid power demand and battery 84 can be charged; and state 3 when the output power demand from the electrical grid to the power support system of the present invention is greater than the available renewable energy power from the power support system.

The term "electrical grid" or grid as used herein refers to an interconnected network for delivering electricity from at least one generating station that normally supplies power to multiple consumers of electrical power that may require a multi-mode, large-scale electric power support system of the present invention. The grid may include multiple generating stations that normally produce electrical power, high voltage transmission lines and lower voltage distribution lines that connect individual consumers of electrical power.

Two or more of the integrated multi-mode or high voltage multi-state, large-scale electric power support systems may be connected in separate geographical areas of an electrical grid and be coordinately controlled so that support power can be supplied from one or more of the separate geographical locations.

In the description above, for the purposes of explanation, numerous specific requirements and several specific details have been set forth in order to provide a thorough understanding of the example and embodiments. It will be apparent however, to one skilled in the art, that one or more other examples or embodiments may be practiced without some of these specific details. The particular embodiments described are not provided to limit the invention but to illustrate it.

Reference throughout this specification to "one example or embodiment," "an example or embodiment," "one or more examples or embodiments," or "different example or embodiments," for example, means that a particular feature may be included in the practice of the invention. In the description various features are sometimes grouped together in a single example, embodiment, figure, or description thereof for the purpose of streamlining the disclosure and aiding in the understanding of various inventive aspects.

The present invention has been described in terms of preferred examples and embodiments. Equivalents, alternatives and modifications, aside from those expressly stated, are possible and within the scope of the invention.

The invention claimed is:

1. An integrated multi-mode, large-scale electric power support system for providing an on demand electrical power from a renewable energy source comprising a renewable solar energy source or a renewable wind energy source and at least one stored energy source to an electrical grid or an on demand reactive power delivery to or absorption from the electrical grid, the integrated multi-mode, large-scale electric power support system comprising:
   a multi-mode controller for controlling a selection of each one of a plurality of system configurations for the integrated multi-mode, large-scale electric power support system responsive to a system mode request from the electrical grid;
   a photovoltaic power station or a wind farm having a DC power capacity of supplying a minimum of 2,500 kW from a plurality of solar renewable energy string circuits or a plurality of wind renewable energy turbine power electronic blocks connected to a renewable energy DC power bus as a supply of a renewable energy DC current, each of the plurality of solar renewable energy string circuits comprising a plurality of photovoltaic modules and each of the plurality of wind renewable energy turbine power electronic blocks comprising a wind turbine and a wind turbine controller connected to an optimizer input of a renewable energy power optimizer, and an optimizer output of the renewable energy power optimizer connected to the renewable energy DC power bus, the optimizer output having a galvanic isolation with the optimizer input;
   a plurality of system power modules, each of the plurality of system power modules comprising:
      an at least one system stored energy DC power module, each of the at least one system stored energy DC power modules comprising:
         an at least one stored energy DC power source selectively connectable to a power module DC BUS by a stored DC power source switching device controlled by the multi-mode controller for alternatively charging of the at least one stored energy DC power source or a supply of a stored energy DC current from the at least one stored energy DC power source dependent upon the selection of each one of the plurality of system configurations;
      a current controller module having a controller input connected across the power module DC BUS and a controller output connected across the power module DC BUS;

a renewable energy switching device for selectively connecting the renewable energy DC power bus to the power module DC BUS dependent upon the selection of each one of the plurality of system configurations;

an inverter/charge module comprising an AC three phase solid state inverter with an inverter gating control circuit for each one of a plurality of solid state switching devices in the AC three phase solid state inverter, the AC three phase solid state inverter having an inverter/charge DC input alternatively connectable to the power module DC BUS in an inverter polarity or a charge circuit reversed polarity dependent upon the selection of each one of the plurality of system configurations, and an inverter/charge AC three phase output producing a three phase AC output currents in each one of a plurality of AC three phase solid state inverters in the plurality of system power modules; and an inverter or charge circuit switching device for selectively connecting the controller output to the inverter polarity or the charge circuit reversed polarity dependent upon the selection of each one of the plurality of system configurations; and a phase shifting transformation network having a transformation multi-phase output connected to the inverter/charge AC three phase output in each of the plurality of system power modules and a transformation multi-phase input connected to the electrical grid having a three phase grid voltage;

whereby the inverter/charge AC three phase output of the AC three phase solid state inverter in each one of the plurality of system power supply modules operates synchronously with the three phase grid voltage when: at least either the supply of the renewable energy DC current or the supply of the stored energy DC current is processed by the current controller module for a grid delivery of the supply of the renewable or the stored energy DC current; or a reactive power is absorbed from the electrical grid or supplied to the electrical grid, and a commutation of the plurality of solid state switching devices in each one of the plurality of AC three phase solid state inverters is sequenced to produce the three phase AC output currents from each one of the plurality of AC three phase solid state inverters and the phase shifting transformation network for phase shifting the three phase AC output currents from all of the plurality of AC three phase solid state inverters to produce a three phase AC grid-injected currents with waveforms having a decreased total harmonic distortion as the number of the plurality of AC three phase solid state inverters is increased.

2. The integrated multi-mode, large-scale electric power support system of claim 1 where the current controller module is alternatively configurable for a selectable mode of: (1) a processing of the supply of the renewable energy DC current from the power module DC bus for the grid delivery of the supply of the renewable energy DC current to the electrical grid; or (2) a processing of the supply of the renewable energy DC current from the power module DC bus and of the supply of the stored energy DC current for the grid delivery of the supply of the renewable energy DC current and the supply of the stored energy DC current to the electrical grid; or (3) a processing of the supply of the renewable energy DC current from the power module DC bus to charge the at least one stored energy DC power source and for the grid delivery of the supply of renewable energy DC current to the electrical grid; or (4) a processing of a grid supplied charge current from the power module DC bus to charge the at least one stored energy DC power source; or (5) a processing of a reactive power absorption from the electrical grid or a reactive power supply to the electrical grid from the plurality of system power modules, the selectable mode dependent upon the selection of each one of the plurality of system configurations by the multi-mode controller.

3. The integrated multi-mode, large-scale electric power support system of claim 1 where the inverter or charge circuit switching device comprises a first switch transistor and a first switch diode connected in series across the power module DC bus having a DC+ and a DC− bus voltages in combination with a second switch transistor and a second switch diode connected across the power module DC bus in parallel with the first switch transistor and the first switch diode arranged so that when the first and second switch transistors are closed, an inverter DC current flows from the current controller module into the inverter/charge module with a DC+ and DC− bus voltage inverter polarities, and when the first and second switch transistors are open, a charge DC current flows from the inverter/charge module with the DC+ and DC− bus voltage for the inverter polarity reversed for the charge circuit reversed polarity.

4. The integrated multi-mode, large-scale electric power support system of claim 1 wherein the renewable energy source comprises a combination of the renewable solar energy source and the renewable wind energy source.

5. The integrated multi-mode, large-scale electric power support system of claim 1 wherein the at least one stored energy DC power source comprises a battery selected from the group of a lead-acid, a lithium-ion and a redox flow battery.

6. A method of supplying an on demand electrical power from an integrated multi-mode, large-scale electric power support system for a renewable energy source comprising a renewable solar energy source or a renewable wind energy source and at least one stored energy source to an electrical grid or an on demand reactive power delivery to or absorption from the electrical grid, the method comprising:

providing a multi-mode controller for controlling a selection of each one of a plurality of system configurations for the integrated multi-mode, large-scale electric power support system responsive to a system mode request from the electrical grid;

providing a photovoltaic power station or a wind farm having a DC power capacity of supplying a minimum of 2,500 kW from a plurality of solar renewable energy string circuits or a plurality of wind renewable energy turbine power electronic blocks connected to a renewable energy DC power bus as a supply of a renewable energy DC current, each of the plurality of solar renewable energy string circuits comprising a plurality of photovoltaic modules and each of the plurality of wind renewable energy turbine power electronic blocks comprising a wind turbine and a wind turbine controller connected to an optimizer input of a renewable energy power optimizer, and an optimizer output of the renewable energy power optimizer connected to the renewable energy DC power bus, the optimizer output having a galvanic isolation with the optimizer input;

providing a plurality of system power modules, each of the plurality of system power modules comprising:
an at least one system stored energy DC power module, each of the at least one system stored energy DC power modules comprising:
an at least one stored energy DC power source selectively connectable to a power module DC BUS by a stored DC power source switching device controlled by the multi-mode controller for alternatively charging of the at least one stored energy DC power source or a supply of a stored energy DC current from the at least one stored energy DC power source dependent upon the selection of each one of the plurality of system configurations;
a current controller module having a controller input connected across the power module DC BUS and a controller output connected across the power module DC BUS, the current controller module alternatively configurable for a selectable mode of: (1) a processing of the supply of renewable energy DC current from the power module DC bus for a grid delivery of the supply of the renewable energy DC current to the electrical grid; or (2) a processing of the supply of the renewable energy DC current from the power module DC bus and of the supply of the stored energy DC current for the grid delivery of the supply of the renewable energy DC current and the supply of the stored energy DC current to the electrical grid; or (3) a processing of the supply of the renewable energy DC current from the power module DC BUS to charge the at least one stored energy DC power source and for the grid delivery of the supply of renewable energy DC current to the electrical grid; or (4) a processing of a grid supplied charge current from the power module DC BUS to charge the at least one stored energy DC power source; or (5) a processing of a reactive power absorption from the electrical grid or a reactive power supply to the electrical grid from the plurality of system power modules, the selectable mode dependent upon the selection of each one of the plurality of system configurations by the multi-mode controller;
a renewable energy switching device for selectively connecting the renewable energy DC power bus to the power module DC BUS dependent upon the selection of each one of the plurality of system configurations;
an inverter/charge module comprising an AC three phase solid state inverter with an inverter gating control circuit for each one of a plurality of solid state switching devices in the AC three phase solid state inverter, the AC three phase solid state inverter having an inverter/charge DC input alternatively connectable to the power module DC BUS in an inverter polarity or a charge circuit reversed polarity dependent upon the selection of each one of the plurality of system configurations, and an inverter/charge AC three phase output producing a three phase AC output currents in each one of a plurality of AC three phase solid state inverters in the plurality of system power modules; and
an inverter or charge circuit switching device for selectively connecting the controller output to the inverter polarity or the charge circuit reversed polarity dependent upon the selection of each one of the plurality of system configurations; and
providing a phase shifting transformation network having a transformation multi-phase output connected to the inverter/charge AC three phase output in each of the plurality of system power modules and a transformation multi-phase input connected to the electrical grid having a three phase grid voltage;
whereby the inverter/charge AC three phase output of of the AC three phase solid state inverter in each one of the plurality of system power supply modules operates synchronously with the three phase grid voltage when: at least either the supply of the renewable energy DC current or the supply of the stored energy DC current is processed by the current controller module for the grid delivery of the supply of the renewable or the stored energy DC current; or a reactive power is absorbed from the electrical grid or supplied to the electrical grid, and a commutation of the plurality of solid state switching devices in each one of the plurality of AC three phase solid state inverters is sequenced to produce the three phase AC output currents from each one of the plurality of AC three phase solid state inverters and the phase shifting transformation network for phase shifting the three phase AC output currents from all of the plurality of AC three phase solid state inverters to produce a three phase AC grid-injected currents with waveforms having a decreased total harmonic distortion as the number of the plurality of AC three phase solid state inverters is increased.

7. A high voltage integrated multi-state, large-scale electric power support system for providing an on demand electrical power from a renewable energy source comprising a renewable solar energy source or a renewable wind energy source and at least one stored energy source to an electrical grid, the high voltage integrated multi-state, large-scale electric power support system comprising:
a multi-state controller for controlling a selection of each one of a plurality of system configurations for the high voltage integrated multi-state, large-scale electric power support system responsive to a system state request from the electrical grid;
a photovoltaic power station or a wind farm having a DC power capacity of supplying a minimum of 50 megawatts from a plurality of solar renewable energy string circuits each comprising a plurality of photovoltaic modules interconnected in a series string circuit or a plurality of wind renewable energy turbine power electronic blocks each comprising a wind turbine and a wind turbine controller;
a plurality of stored DC energy modules, each one of the plurality of stored DC energy modules comprising a stored DC energy source and a stored DC energy source management system;
a plurality of DC power optimization modules, each of the plurality of DC optimization modules comprising:
an energy state switch comprising:
a renewable DC energy source input connected to one of the plurality of solar renewable energy string circuits terminating to a system electrical ground or to one of the plurality of wind renewable energy turbine electronic blocks terminating to the system electrical ground;
a stored DC energy source input connected to one of the plurality of stored DC energy modules; and an energy state switch output, the energy state switch selectively switchable to: (1) provide DC power from the one of the plurality of solar renewable energy string circuits or from the one of the plurality of wind renewable energy turbine electronic blocks to the energy state switch output; (2) provide DC power from the one of the plurality of solar renewable energy string circuits or from the one of the plurality of wind renewable energy turbine electronic blocks to charge the stored DC energy source in the one of the plurality of stored DC energy modules; or (3) provide DC power from the one of the plurality of solar renewable energy string circuits or from the one of the plurality of wind renewable energy turbine electronic blocks and the stored DC energy source in the one of the plurality of stored DC energy modules to the energy state switch output; and a HV power optimizer comprising:
a DC-to-DC converter having an input inverter connected to the energy state switch output and the system electrical ground and an output inverter;
the output inverter of the HV power optimizers in all of the plurality of DC power optimization modules connected together in a series string high voltage DC series circuit across a HVDC BUS forming a high voltage DC power transmission link, the series string high voltage DC series circuit having an electric potential of at least 10 kilovolts; the high voltage DC power transmission link having a first and a second end high voltage DC power transmission link terminations, the first end high voltage DC power transmission link termination connected across the series string high voltage DC series circuit; and
a plurality of DC-to-AC inverters, each one of the plurality of DC-to-AC inverters having an inverter DC input and an inverter three phase AC output, the inverter DC input of each one of the plurality of DC-to-AC inverters series interconnected to form a series string inverter DC input circuit, the second end high voltage DC power transmission link termination connected across the series string inverter DC input circuit, the inverter three phase AC output of each one of the plurality of regulated current source inverters in voltage synchronization with the voltage of the electrical grid, and each phase current of the inverter three phase AC output of each one of the plurality of regulated current source inverters having a stepped current waveform; and
at least one phase shifting transformation network, each of the at least one phase shifting transformation networks connecting the inverter AC outputs of the plurality of regulated current source inverters to the AC transmission network.

8. The high voltage integrated multi-state, large-scale electric power support system of claim 7 wherein the renewable energy source comprises a combination of the renewable solar energy source and the renewable wind energy source.

9. The high voltage integrated multi-state, large-scale electric power support system of claim 7 wherein the plurality of DC power optimization modules comprises a HVDC power module having four DC power optimization modules.

10. The high voltage integrated multi-mode, large-scale electric power support system of claim 7 wherein the plurality of DC power optimization modules comprises two HVDC power modules connected together in parallel, each of the two HVDC power modules having four DC power optimization modules.

11. The high voltage integrated multi-state, large-scale electric power support system of claim 7 wherein the plurality of DC power optimization modules comprises four HVDC power modules, a first pair of the four HVDC power modules connected together in series and a second pair of the four HVDC power modules connected together in series, the first and the second pairs of four HVDC power modules connected together in parallel each of the four HVDC power modules having four DC power optimization modules, the plurality of DC-to-AC inverters comprises eight DC-to-AC inverters, a first quadruple of the eight DC-to-AC inverters having the inverter three phase outputs connected to a first of the at least one phase shifting transformation network and a second quadruple of the eight DC-to-AC inverter having the inverter three phase outputs connected to a second of the at least one phase shifting transformation network.

12. A method of supplying an on demand electrical power from a high voltage integrated multi-state, large-scale electric power support system for a renewable energy source comprising a renewable solar energy source or a renewable wind energy source and at least one stored energy source to an electrical grid, the method comprising:
providing a multi-state controller for controlling a selection of each one of a plurality of system configurations for the high voltage integrated multi-state, large-scale electric power support system responsive to a system state request from the electrical grid;
providing a photovoltaic power station or a wind farm having a DC power capacity of supplying a minimum of 50 megawatts from a plurality of solar renewable energy string circuits each comprising a plurality of photovoltaic modules interconnected in a series string circuit or a plurality of wind renewable energy turbine power electronic blocks each comprising a wind turbine and a wind turbine controller;
providing a plurality of stored DC energy modules, each one of the plurality of stored DC energy modules comprising a stored DC energy source and a stored DC energy source management system;
providing a plurality of DC power optimization modules, each of the plurality of DC optimization modules comprising:
an energy state switch comprising:
a renewable DC energy source input connected to one of the plurality of solar renewable energy string circuits terminating to a system electrical ground or to one of the plurality of wind renewable energy turbine electronic blocks terminating to the system electrical ground;
a stored DC energy source input connected to one of the plurality of stored DC energy modules; and
an energy state switch output, the energy state switch selectively switchable to: (1) provide DC power from the one of the plurality of solar renewable energy string circuits or from the one of the plurality of wind renewable energy turbine electronic blocks to the energy state switch output; (2) provide DC power from the one of the plurality of solar renewable energy string circuits or from the one of the plurality of wind renewable energy turbine electronic blocks to charge the stored DC energy source in the one of the plurality of stored DC energy modules; or (3) provide DC power from the one of the plurality of solar renewable energy string circuits or from the one of the plurality of wind renewable energy turbine electronic blocks and the stored DC energy source in the one of the plurality of stored DC energy modules to the energy state switch output; and a HV power optimizer comprising:
   a DC-to-DC converter having an input inverter connected to the energy state switch output and the system electrical ground and an output inverter;

the output inverter of the HV power optimizers in all of the plurality of DC power optimization modules connected together in a series string high voltage DC series circuit across a HVDC BUS forming a high voltage DC power transmission link, the series string high voltage DC series circuit having an electric potential of at least 15 kilovolts; the high voltage DC power transmission link having a first and a second end high voltage DC power transmission link terminations, the first end high voltage DC power transmission link termination connected across the series string high voltage DC series circuit; and providing a plurality of DC-to-AC inverters, each one of the plurality of DC-to-AC inverters having an inverter DC input and an inverter three phase AC output, the inverter DC input of each one of the plurality of DC-to-AC inverters series interconnected to form a series string inverter DC input circuit, the second end high voltage DC power transmission link termination connected across the series string inverter DC input circuit, the inverter three phase AC output of each one of the plurality of regulated current source inverters in voltage synchronization with the voltage of the electrical grid, and each phase current of the inverter three phase AC output of each one of the plurality of regulated current source inverters having a stepped current waveform; and at least one phase shifting transformation network, each of the at least one phase shifting transformation networks connecting the inverter AC outputs of the plurality of regulated current source inverters to the AC transmission network.

* * * * *